US012296657B1

(12) United States Patent
Chen

(10) Patent No.: US 12,296,657 B1
(45) Date of Patent: May 13, 2025

(54) METHODS AND SYSTEMS FOR REDUCING INTENSITY OF LIGHT INCIDENT ON A VEHICLE

(71) Applicant: Adeia Guides Inc., San Jose, CA (US)

(72) Inventor: Tao Chen, Palo Alto, CA (US)

(73) Assignee: ADEIA GUIDES INC., San Jose, CA (US)

(*) Notice: Subject to any disclaimer, the term of this patent is extended or adjusted under 35 U.S.C. 154(b) by 0 days.

(21) Appl. No.: 18/618,652

(22) Filed: Mar. 27, 2024

(51) Int. Cl.
B60J 3/04 (2006.01)
B60Q 1/14 (2006.01)
G02F 1/13 (2006.01)
G02F 1/133 (2006.01)
H04W 4/44 (2018.01)

(52) U.S. Cl.
CPC ................ B60J 3/04 (2013.01); B60Q 1/143 (2013.01); G02F 1/1309 (2013.01); G02F 1/13306 (2013.01); H04W 4/44 (2018.02); B60Q 2300/42 (2013.01)

(58) Field of Classification Search
CPC ........ B60J 3/04; B60Q 1/143; B60Q 2300/42; G02F 1/1309; G02F 1/13306; H04W 4/44
See application file for complete search history.

(56) References Cited

U.S. PATENT DOCUMENTS

| 4,190,832 A * | 2/1980 | Mohler | G02F 1/1313 |
| | | | 349/96 |
| 6,733,160 B2 | 5/2004 | DeVolpi | |
| 6,774,367 B2 | 8/2004 | Stephan et al. | |
| 7,978,274 B2 * | 7/2011 | Umezaki | G02F 1/136286 |
| | | | 349/139 |
| 9,186,963 B2 | 11/2015 | Tewari et al. | |
| 9,300,423 B2 | 3/2016 | Rubin et al. | |
| 10,940,791 B2 | 3/2021 | Correa et al. | |
| 2012/0212320 A1 | 8/2012 | Oberholtzer | |
| 2014/0309806 A1 * | 10/2014 | Ricci | G06F 21/31 |
| | | | 701/1 |

(Continued)

FOREIGN PATENT DOCUMENTS

EP 3753766 A1 12/2020

OTHER PUBLICATIONS

"GNSS software-defined receiver," Wikipedia, https://en.wikipedia.org/wiki/GNSS_software-defined_receiver.

(Continued)

Primary Examiner — Donald L Raleigh
(74) Attorney, Agent, or Firm — HALEY GUILIANO LLP

(57) ABSTRACT

Systems and methods are described for operating a light source to vary the intensity of light output by the light source by alternating between a first intensity and a second intensity higher than the first intensity according to a clock signal, wherein for the first set of time periods the light source outputs light of the first intensity and for the second set of time periods the light source outputs light of the second intensity, and operating a window shutter system to vary the transparency of the window by alternating between a first transparency and a second transparency lower than the first transparency according to the clock signal, wherein for a first set of time periods the window has the first transparency, and for the second set of time periods the window has the second transparency.

20 Claims, 13 Drawing Sheets

(56) References Cited

U.S. PATENT DOCUMENTS

2017/0001553 A1   1/2017   Hue et al.

OTHER PUBLICATIONS

"Precision Clocks used in Software Defined Radios (SDRs)," COTS Journal, Jun. 8, 2022, https://www.cotsjournalonline.com/index.php/2022/06/08/precision-clocks-used-in-software-defined-radios-sdrs/.
Simon Nditiru, "SDRs as a Reference and Common Clock Source for GNSS Timing Apps," Microwaves&RF Jun. 30, 2021, https://www.mwrf.com/technologies/embedded/systems/article/21168561/per-vices-corp-sdrs-as-a-reference-and-common-clock-source-for-gnss-timing-apps.
"Software Defined Radio Use Case for GPS/GNSS," everythingRF, Nov. 29, 2021, https://www.everythingrf.com/community/sdr-use-cases-1-gps-gnss.

\* cited by examiner

Fig. 1
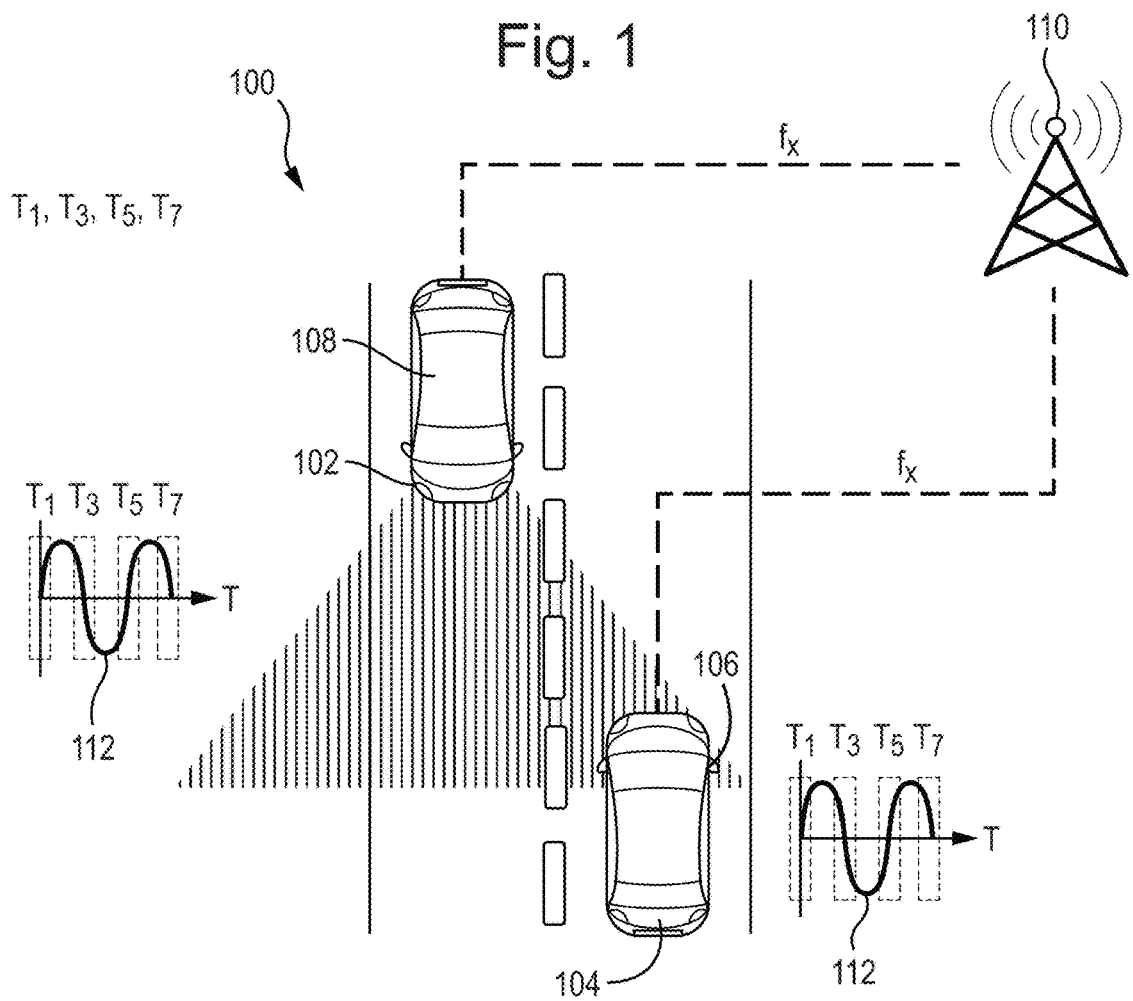
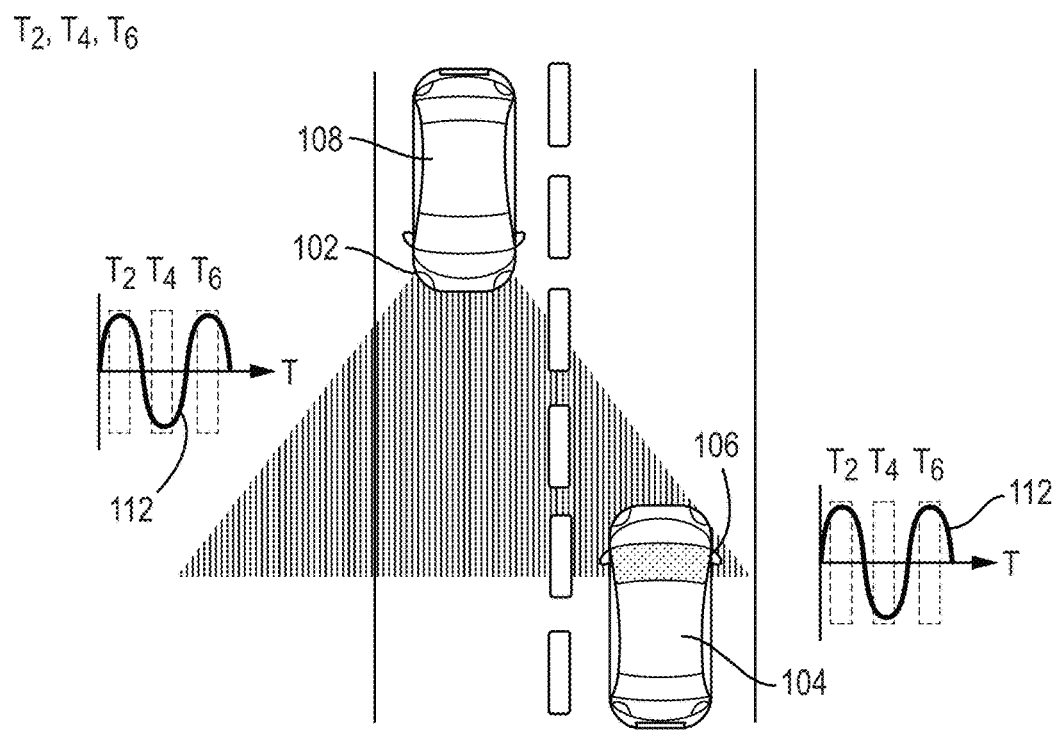

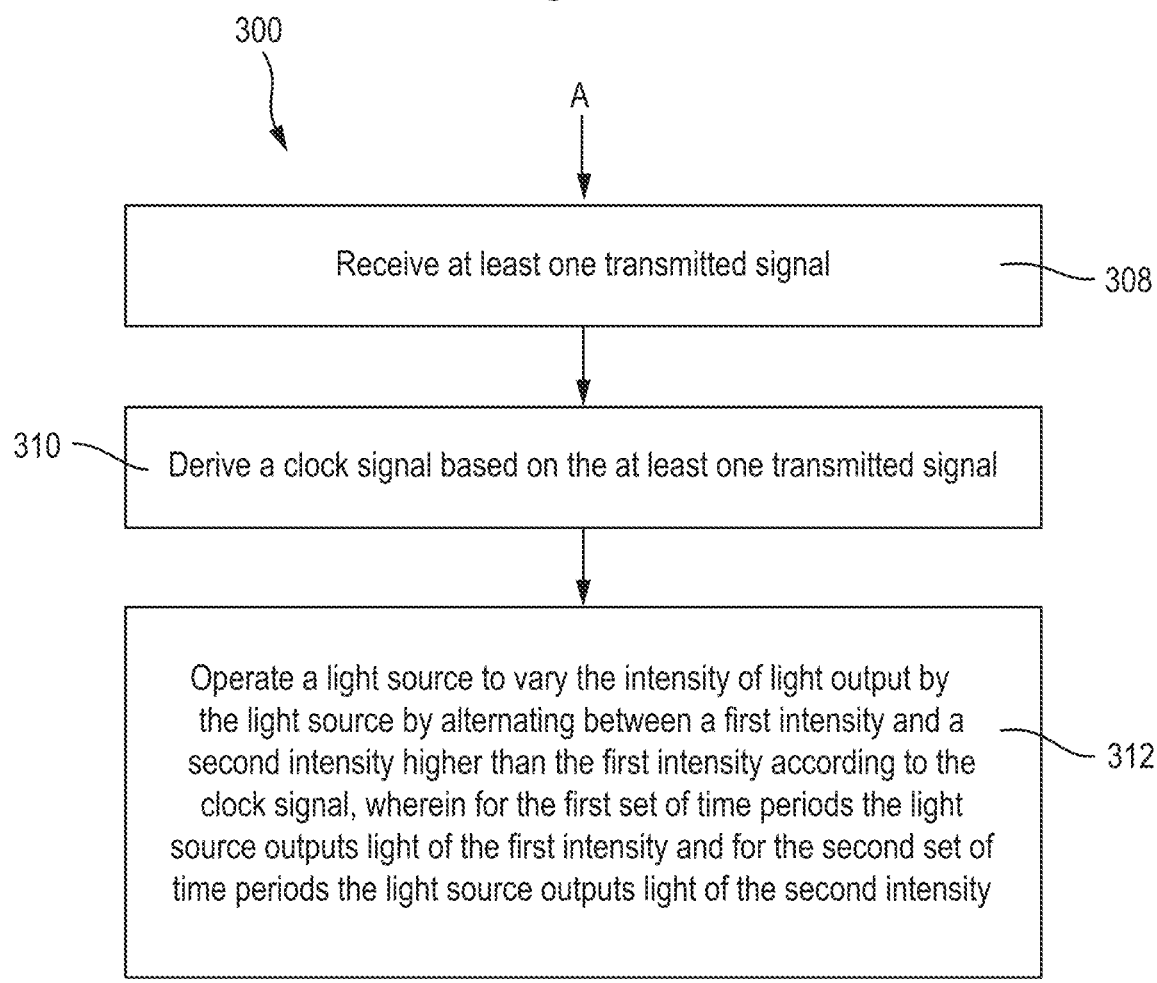

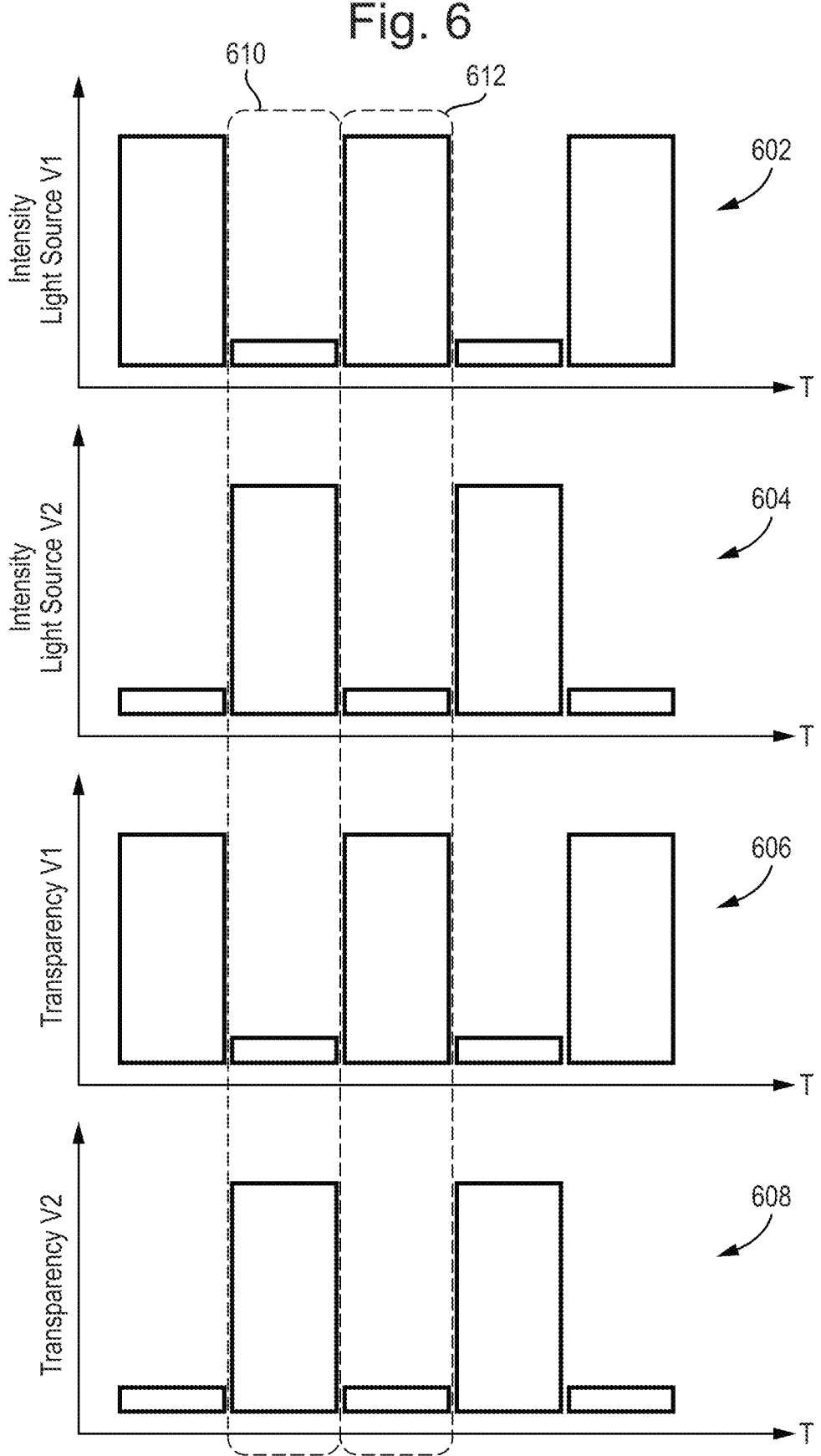

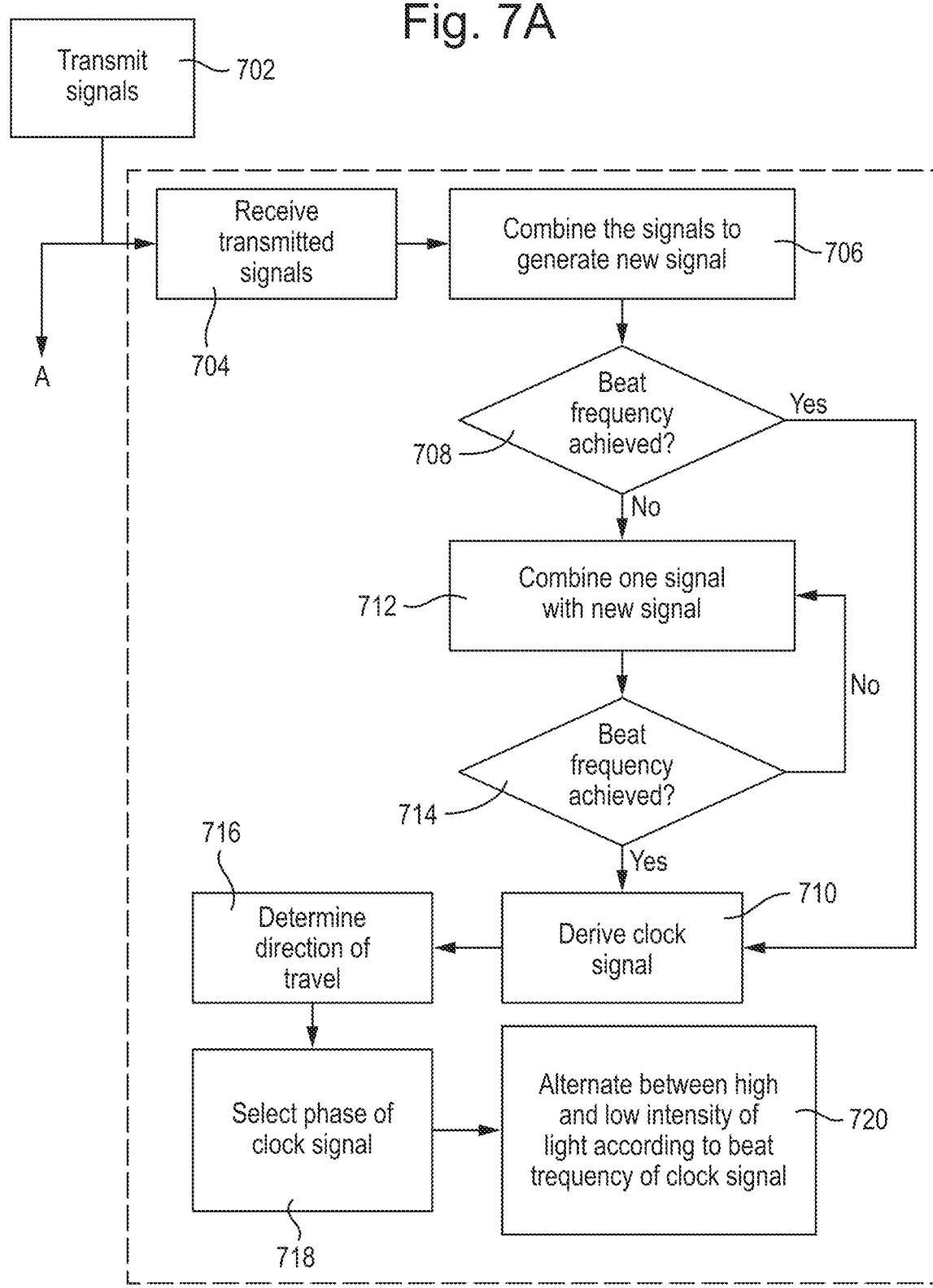

Fig. 9
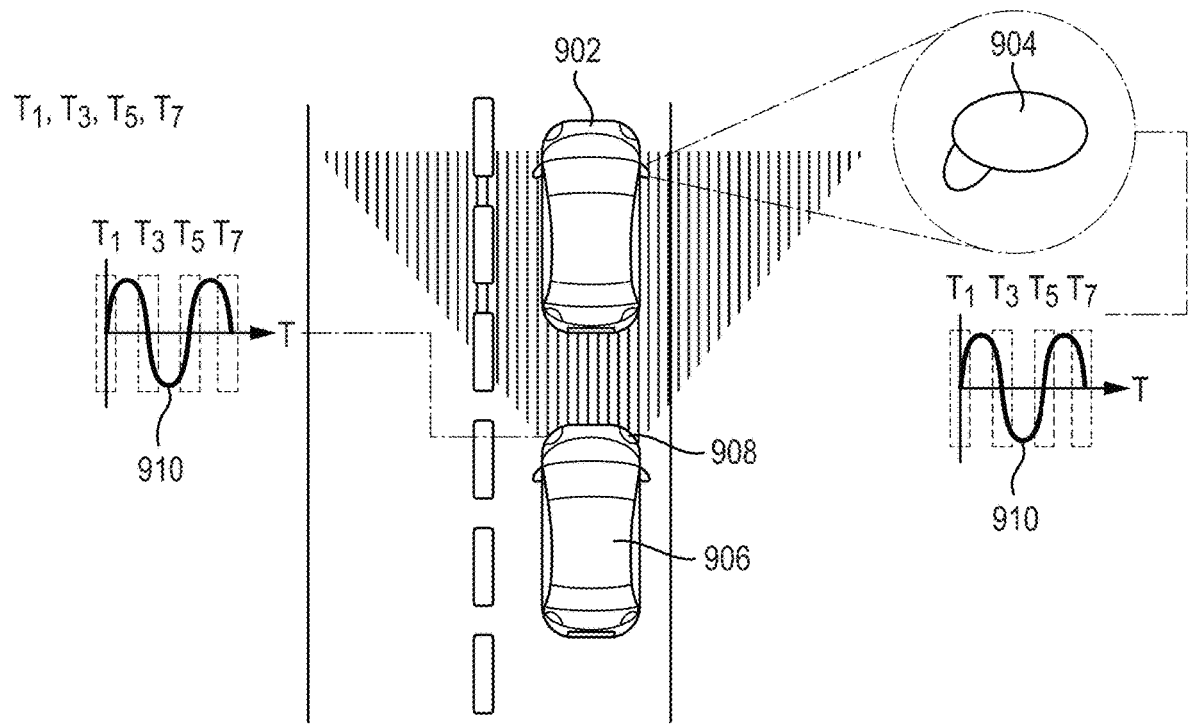
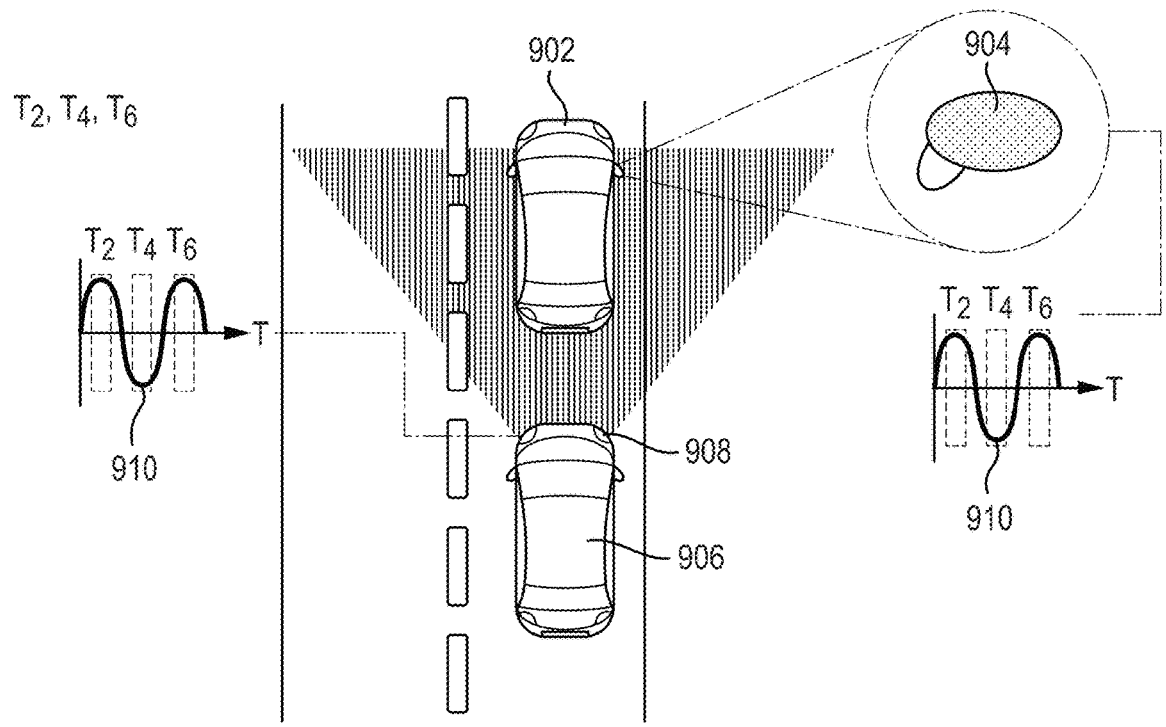

Fig. 10
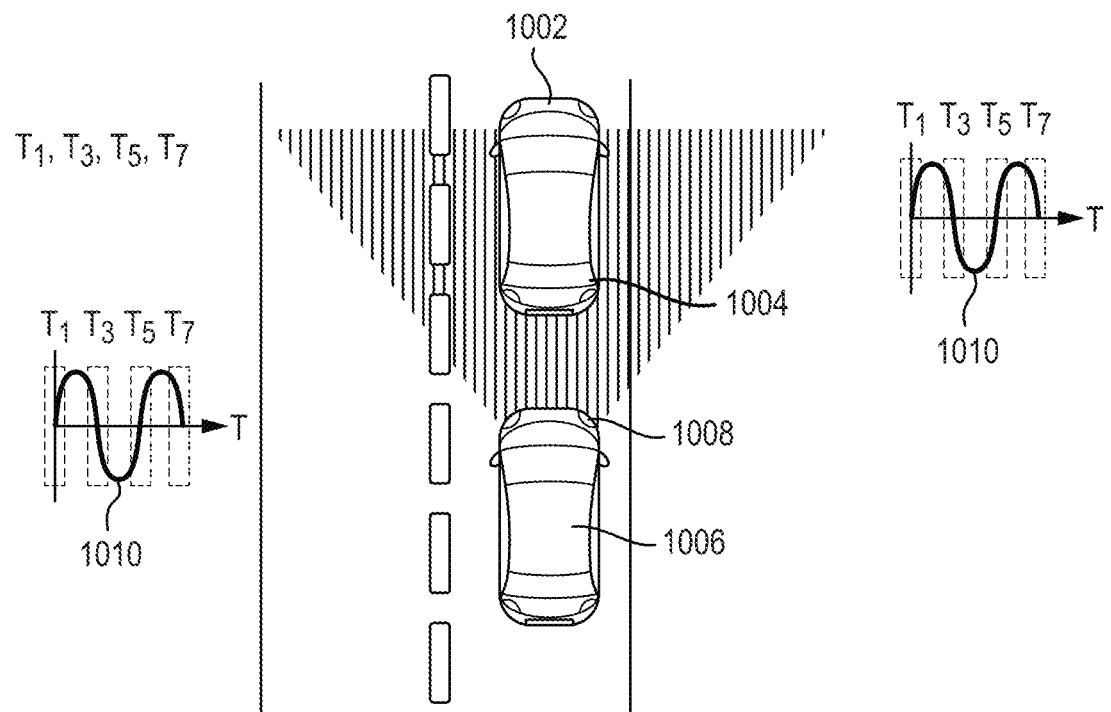
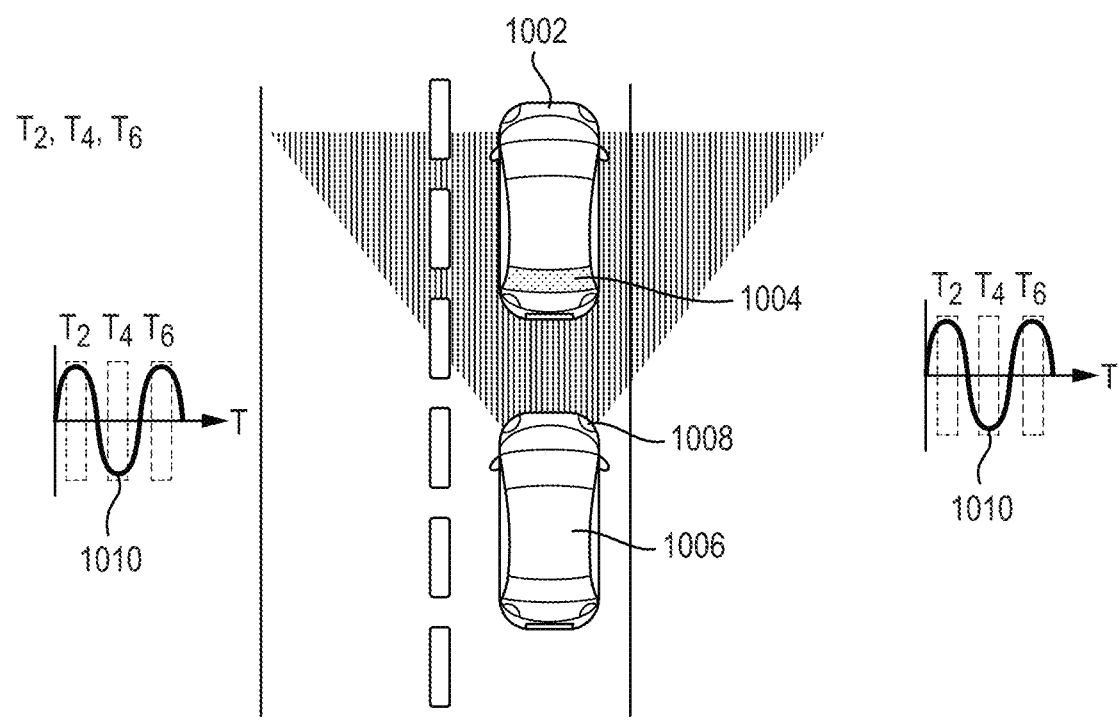

METHODS AND SYSTEMS FOR REDUCING INTENSITY OF LIGHT INCIDENT ON A VEHICLE

BACKGROUND

The present disclosure relates to methods and systems for reducing glare for an occupant of a vehicle caused by an external light source. Particularly, but not exclusively, the present disclosure relates to reducing the intensity of light incident on a first vehicle from incoming headlights of a second vehicle by operating a window shutter system to vary the transparency of a window of the first vehicle.

SUMMARY

Modern vehicles, such as cars, are being supplied with increasingly bright LED headlights which improve visibility for the driver of the vehicle. It is desirable to provide a mechanism to reduce the glare of headlights for drivers of oncoming vehicles while enabling a driver of a vehicle to make full use of the intensity of the headlights of their vehicle. In some cases, an environment in which a vehicle operates may have bright lights, e.g., an urban environment at nighttime. In a similar manner, it is desirable to provide a mechanism to reduce the glare of environment lighting while enabling a driver of a vehicle to make full use of the intensity of the environmental lighting.

Systems and methods are provided herein for improving visibility for operators of vehicles. In particular, systems and methods are provided herein for coordinating a variation of the transparency of windshields with a variation of the intensity of headlights for multiple vehicles, for example, in order to reduce glare from headlights of multiple oncoming vehicles for an occupant of a vehicle, while enabling the oncoming vehicles to make full use of high intensity headlights. For example, by receiving a transmitted signal, and using that signal to derive a clock signal which is used to dictate the timings for shuttering of a windshield and flickering of headlights, any vehicle receiving the same transmitted signal may derive the same clock signal, and therefore the timings of the shuttering and flickering may be coordinated between any number of vehicles.

According to the systems and methods described herein, a vehicle comprises a window shutter system operable to vary the transparency of a window of the vehicle. For example, a vehicle may comprise a window such as a windshield. At the vehicle, at least one transmitted signal is received. For example, at least one radio signal may be received, such as a software-defined radio (SDR) signal. A clock signal based on the at least one transmitted signal is derived. For example, processing may be applied to the at least one transmitted signal in order to derive the clock signal. The processing may be predefined processing. The window shutter system is operated to vary the transparency of the window by alternating between a first transparency and a second transparency lower than the first transparency according to the clock signal. In some examples, the second transparency may be a transparency at which the window is substantially opaque. The second transparency may be a transparency at which a predefined threshold intensity of light is able to pass through the window, for example an intensity of light which does not cause the vision of an occupant of the vehicle to be impaired. For a first set of time periods the window has the first transparency, and for the second set of time periods the window has the second transparency. For example, the first set of time periods may be a series of time periods that alternate with a series of time periods of the second set of time periods. For example, the transparency of the window may alternate between an "off" configuration in which the transparency of the window is high (during the first set of time periods, e.g., zero crossings of the clock signal), and an "on" transparency in which the transparency is low (during the second set of time periods, e.g., peaks and troughs of the clock signal), for example, where an active shutter system is activated to reduce the amount of light able to pass through the window. At a light source operable to vary the intensity of light output by the light source, the at least one transmitted signal is received. The light source may, for example, be a light source of a second vehicle, such as a headlight system of the second vehicle. The clock signal is derived based on the at least one transmitted signal. For example, the clock signal derived by the light source may be the same clock signal derived by the vehicle. In this way, the vehicle and the light source are able to establish a common time frame. The light source is operated to vary the intensity of light output by the light source by alternating between a first intensity and a second intensity higher than the first intensity according to the clock signal. For the first set of time periods the light source outputs light of the first intensity and for the second set of time periods the light source outputs light of the second intensity. For example, the intensity of the light output may alternative between an "off" configuration in which the intensity of light output is low (during the first set of time periods, e.g., zero crossings of the clock signal), and an "on" configuration in which the intensity of light output is higher (during the second set of time periods, e.g., peaks and troughs of the clock signal). In this way, the output of the light source may be coordinated with the window shutter system of the vehicle such that while the light source outputs light of a higher intensity, the window shutter system reduces the transparency of the window of the vehicle, and when the light source outputs light of a lower intensity, the window shutter system increases the transparency of the window of the vehicle. These changes may be made at a frequency that is imperceptible to human vision. Thus, the occupant of the vehicle may experience a reduction in intensity of light from incoming light sources, thereby improving visibility for the occupant, while the light source is able to generate high levels of illumination (e.g., for another vehicle having the light source) which may be experienced by a user associated with the light source.

In some examples, the vehicle is travelling in a first direction comprised in a first set of predefined directions, and the light source is outputting light in, or is travelling in, a second direction comprised in a second set of predefined directions. For example, the first set of predefined directions may comprise a set of predefined directions opposite to those of the second set of predefined directions. For example, the first set of predefined directions may comprise directions West to East (through North), whereas the second set of predefined directions may comprise directions East to West (through South). Thus, a vehicle travelling in a direction substantially opposite to the direction of the light source (e.g., a vehicle comprising the light source) will coordinate the reduction and increase of light from the light source with an increase and reduction of transparency of the window. By setting the timing of the output of the light source and the operation of the window shutter system based on a direction of travel or the like, the operation of multiple vehicles can be coordinated. In some examples, the first set of predefined direction and the second set of predefined directions may correspond to a current location of the vehicle and/or the light source. For example, different sets of predefined directions may be defined for different locations.

In some examples, the window shutter system is operated to vary the transparency of the window according to a phase of the clock signal, wherein the window shutter system operates according to a first phase of the clock signal when the vehicle is travelling in a first direction comprised in a first set of predefined directions, and a second phase of the clock signal when the vehicle is travelling in a second direction comprised in a second set of predefined directions. For example, vehicles travelling in substantially opposite direction may operate their respective window shutter systems out of phase with one another. In some examples, the light source is operated to vary the intensity of light output by the light source according to a phase of the clock signal, wherein the light source operates according to a first phase of the clock signal when the light source is outputting light in, or is travelling in, a third direction comprised in a second set of predefined directions, and a second phase of the clock signal when the light source is outputting light in, or is travelling in, a fourth direction comprised in the first set of predefined directions. For example, vehicles comprising the light source travelling in substantially opposite directions may operate their respective light sources out of phase with one another. Where a light source is travelling or emitting light in a direction comprised in the first set of directions and the vehicle is travelling in a direction comprised in the second set of directions, the operation of the light source and the window shutter system of the vehicle may be in phase.

In some examples, the phase difference between the first phase and the second phase is $\pi/2$ radians.

In some examples, the alternating of the transparency of the window is at a rate corresponding to a beat frequency of the clock signal. In some examples, the alternating of the intensity of the light output by the light source is at a rate corresponding to the beat frequency of the clock signal. The beat frequency of the clock signal may be a frequency at which the window shutter system and the light source is able to operate, such as a frequency of around 240 Hz. Such a frequency may result in 120 pulses of light per second, and 120 periods of increased opacity of the window. The beat frequency may be a frequency which causes the light source and the window shutter system to operate at a rate which is imperceptible to the human eye.

In some examples, the direction of travel of the vehicle is determined based on any or any combination of a direction the vehicle is facing, a direction of travel of the vehicle during a predefined time period, an intended path of travel of the vehicle, or a road on which the vehicle is currently travelling. For example, the direction of travel of the vehicle may be determined based on GPS information, internal sensors of the vehicle, and so on.

In some examples, the clock signal is derived by combining at least two received signals to generate a resulting signal, and iteratively combining one of the two received signals with the resulting signal until a derived signal having a beat frequency at or below a predetermined beat frequency is generated, wherein the derived signal is designated as the clock signal. For example, the signals may be combined until a signal having the predetermined frequency is achieved, such as a beat frequency at, close to or below a particular value, such as 240 Hz.

In some examples, the at least one transmitted signal corresponds to a current location of the vehicle and/or the light source. In some examples, at the vehicle, at least one signal of the at least one transmitted signal is selected, and the selected signal is used to derive the clock signal, wherein the signal is selected based on a current location of the first vehicle. In some examples, at the light source, the at least one signal of the at least one transmitted signal is selected, and the selected signal is used to derive the clock signal, wherein the signal is selected based on a current location of the light source. For example, the vehicle and/or the light source may opt to receive particular signals, or may select particular signals from among received signals, or may be sent particular signals, based on their current location. For example, different signals may be designated to be selected for different regions. When the vehicle and the light source are located within the same region, the same signals may be received by the vehicle and the light source, which may result in the same clock signal being generated.

In some examples, the at least one transmitted signal is received from a source external to the first vehicle and the light source. For example, the transmitted signal may be a radio signal, and may be transmitted from a radio broadcast tower.

In some examples, in response to detecting a fault in the window shutter system, the window is set to the first transparency. For example, the window may be set to full transparency in the event that a fault is detected in order that occupants are able to continue to see through the window. For example, where no power is supplied to the window, the window may be substantially transparent.

According to the systems and methods described herein, at a vehicle comprising a window shutter system operable to vary the transparency of a window of the vehicle and a light source operable to vary the intensity of light output by the light source, at least one transmitted signal is received. A common clock signal based on the at least one transmitted signal is derived. The window shutter system is operated to vary the transparency of the window by alternating between a first transparency and a second transparency lower than the first transparency according to the clock signal, wherein for a first set of time periods the window has the first transparency, and for the second set of time periods the window has the second transparency. The light source is operated to vary the intensity of light output by the light source by alternating between a first intensity and a second intensity higher than the first intensity according to the clock signal, wherein for the first set of time periods the light source outputs light of the second intensity and for the second set of time periods the light source outputs light of the first intensity. In this way, the output of the light source may be coordinated with the window shutter system of the vehicle such that while the light source outputs light of a higher intensity, the window shutter system increases the transparency of the window of the vehicle, and when the light source outputs light of a lower intensity, the window shutter system reduces the transparency of the window of the vehicle, such that the light appears to the occupant of the vehicle to be of high intensity.

According to the systems and methods described herein, at a vehicle comprising a rearview mirror shutter system operable to vary the amount of light reflected by a mirror of the vehicle, at least one transmitted signal is received. A common clock signal based on the at least one transmitted signal is derived. The mirror shutter system is operated to vary the reflectiveness of the mirror by alternating between a first reflectiveness and a second reflectiveness lower than the first reflectiveness according to the clock signal, wherein for a first set of time periods the mirror has the first reflectiveness, and for the second set of time periods the mirror has the second reflectiveness. At a light source operable to vary the intensity of light output by the light source, at least one transmitted signal is received. A common clock signal is derived based on the at least one transmitted signal. The light source is operated to vary the intensity of light output by the light source by alternating between a first intensity and a second intensity higher than the first intensity according to the clock signal, wherein for the first set of time periods the light source outputs light of the first intensity and for the second set of time periods the light source outputs light of the second intensity. The vehicle and the light source may be travelling (or emitting light) in the same direction.

According to the systems and methods described herein, at a vehicle comprising a window shutter system operable to vary the transparency of a rear window of the vehicle, at least one transmitted signal is received. A common clock signal based on the at least one transmitted signal is derived. The window shutter system is operated to vary the transparency of the rear window by alternating between a first transparency and a second transparency lower than the first reflectiveness according to the clock signal, wherein for a first set of time periods the rear window has the first transparency, and for the second set of time periods the rear window has the second transparency. At a light source operable to vary the intensity of light output by the light source, at least one transmitted signal is received. A common clock signal based on the at least one transmitted signal is derived. The light source is operated to vary the intensity of light output by the light source by alternating between a first intensity and a second intensity higher than the first intensity according to the clock signal, wherein for the first set of time periods the light source outputs light of the first intensity and for the second set of time periods the light source outputs light of the second intensity. The vehicle and the light source may be travelling (or emitting light) in the same direction.

According to the systems and methods described herein, at a window, e.g., of a building, comprising a window shutter system operable to vary the transparency of the window, at least one transmitted signal is received. A common clock signal based on the at least one transmitted signal is derived. The window shutter system is operated to vary the transparency of the window by alternating between a first transparency and a second transparency lower than the first reflectiveness according to the clock signal, wherein for a first set of time periods the window has the first transparency, and for the second set of time periods the rear window has the second transparency. At a light source, e.g., a vehicle head lamp, operable to vary the intensity of light output by the light source, at least one transmitted signal is received. A common clock signal based on the at least one transmitted signal is derived. The light source is operated to vary the intensity of light output by the light source by alternating between a first intensity and a second intensity higher than the first intensity according to the clock signal, wherein for the first set of time periods the light source outputs light of the first intensity and for the second set of time periods the light source outputs light of the second intensity. In some examples, the light source is a headlamp of a vehicle and may be travelling (or emitting light) in a direction towards the window. In some examples, the systems and methods are provided for improving conditions for operating a device illuminated by the light source through the window.

According to the systems and methods described herein, a window shutter system operable to vary the transparency of a window and a light source operable to vary the intensity of light output by the light source are provided. Data comprising a timing signal is received at the window shutter system. Data comprising the timing signal is received at the light source. The window shutter system is operated to vary the transparency of the window by oscillating between a first transparency and a second transparency lower than the first transparency according to the timing signal. The light source is operated to vary the intensity of light output by the light source out of phase with the transparency of the window.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 illustrates an overview of the system for coordinating variations in the transparency of a window of a vehicle with variations in the intensity of light output by a light source, in accordance with some examples of the disclosure;

FIGS. 3A and 3B illustrate a flowchart representing a process for coordinating variations in the transparency of a window of a vehicle with variations in the intensity of light output by a light source, in accordance with some examples of the disclosure;

FIG. 6 illustrates the intensity of light output by a light source of a first vehicle and a light source of a second vehicle, and the transparency of a window of the first vehicle and a window of the second vehicle, during a series of time periods, in accordance with some examples of the disclosure;

FIGS. 7A and 7B illustrate a flowchart representing a process for coordinating variations in the transparency of a window of a vehicle with variations in the intensity of light output by a light source, in accordance with some examples of the disclosure;

FIG. 9 illustrates an overview of the system for coordinating variations in the reflectiveness of a mirror of a vehicle with variations in the intensity of light output by a light source, in accordance with some examples of the disclosure; and FIG. 10 illustrates an overview of the system for coordinating variations in the transparency of a rear window of a vehicle with variations in the intensity of light output by a light source, in accordance with some examples of the disclosure.

DETAILED DESCRIPTION

Figure 2:
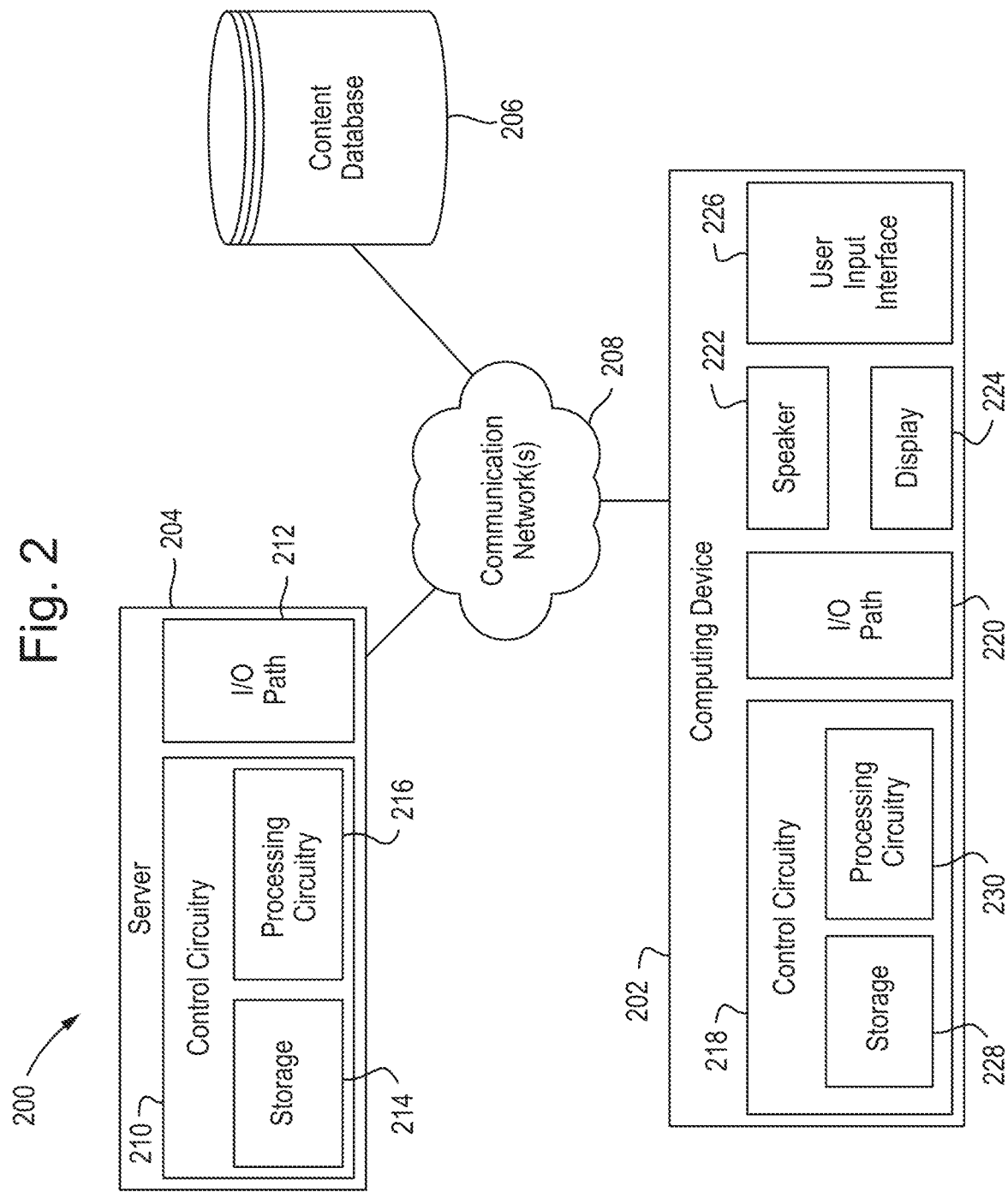
FIG. 2 is a block diagram showing components of an example system for coordinating variations in the transparency of a window of a vehicle with variations in the intensity of light output by a light source, in accordance with some examples of the disclosure.

FIG. 1 illustrates an overview of a system 100 for coordinating the operation of a light source 102 and a window shutter system of a vehicle 102. In particular, the example shown in FIG. 1 illustrates a first vehicle 104 comprising a window shutter system for varying the transparency of a window 106 of the first vehicle 104. The window shutter system may, for example, utilize a liquid crystal layer comprised in the window 106 which turns more opaque when voltage is applied, but is otherwise transparent. A window shutter system as described herein may utilize any appropriate electrical means to change the opacity of a window, such as privacy glass, or switchable glass, which uses electrochromic technology to interchange between transparent and opaque states by applying voltage. Where the voltage is applied and removed at a sufficiently high frequency, the change between an opaque and transparent window will be indistinguishable to the human eye, and the user will experience the window as being perpetually transparent. FIG. 1 further illustrates a second vehicle 108 comprising the light source 102, which in this example is in the form of a headlight system. In this example, the light source 102 and the first vehicle 104 are travelling in opposing directions on the same road. The light source 102 is operable to flicker, such that light output by the light source 102 varies between higher intensity light and lower intensity light. In this example, a base station 110 is configured to provide signals of various frequencies. In this example, the base station is a radio broadcast station, however, it will be appreciated that the base station may be configured to transmit or receive any type of signal. Each of the first vehicle 104 and the light source 102 (and/or the second vehicle 108) are configured to receive signals from the base station 110. For example, the first vehicle 104 and/or the second vehicle 108 may comprise a software defined radio (SDR) receiver. In this example, the same signals $f_x$ are received from the base station 110 by each of the first vehicle 102 and the second vehicle 108 ($f_x$ may be considered to represent any number of signals). An SDR may utilize various known techniques in order to compensate for differences in the phase of transmitted and received signals. Each of the first vehicle 102 and the second vehicle 108 are configured to independently derive the same clock signal 112 based on the received signal(s) $f_x$, where the clock signal 112 is usable to time the operation of the window shutter system and the light source 102.

FIG. 1 further illustrates the usage of the clock signal 112 to operate the light source 102 and the window shutter system 106 during a first set of time periods $T_1, T_3, T_5, T_7$, and during a second set of time periods $T_2, T_4, T_6$. As is illustrated here, during the first set of time periods, the clock signal 112 passes through a zero crossing, and during the second set of time periods, the clock signal 112 passes through peaks and troughs. As the light source 102 and the window shutter system are operating at a frequency corresponding to the clock signal 112, for example, the voltage applied to the window 106 of the window shutter system and the light source 102 is varied according to the frequency of the clock signal 112, the window 106 will vary between a less transparent and more transparent state in sync with a variation in the increase and reduction in intensity of the light output from the light source 102, such that when the light from the light source 102 is of a lower intensity, the window 106 is more transparent, and when the light from the light source 102 is of a higher intensity, the window 106 is less transparent. By timing the shuttering of the window 106 with the flickering of the light source 102 such that during the first set of time periods, the intensity of light is low and the window 106 is substantially transparent, and during the second set of time periods, the intensity of light is high and the window 106 is less transparent, the intense light is blocked from view of an occupant of the first vehicle. In this way, an occupant of the first vehicle 104 does not have their vision impeded by the intense lights output from the light source 102, while an occupant of the second vehicle 108 is able to benefit from the intense light output by the light source 102.

In this example, the light source 102 is illustrated as being a light source comprised in a vehicle. However, in some examples, the light source 102 may be any light source which may be in the vicinity of passing vehicles. For example, the light source may be a light source of signage (e.g., for pedestrians, on buildings, and so on). While the examples illustrated herein show cars as an example of a vehicle, a vehicle as described herein may be any type of vehicle, such as a car, a lorry, a van, a motorcycle, a truck, a bus, a train, a bicycle, an airplane, a hovercraft, a boat, a drone, a space vehicle, and so on.

It will be appreciated that while the clock signal is represented in the examples herein as a sinusoidal wave oscillating around the x axis, the clock signal is not limited to such a signal, and any signal which alternates between higher and lower y values for example may be utilized. The clock signal may be any appropriate form of signal with a consistent frequency, such as square waves, triangular waves, sawtooth waves, and so on. The clock signal will be discussed in more detail below.

FIG. 2 is an illustrative block diagram showing example system 200, e.g., a non-transitory computer-readable medium, configured to vary the output of the light source 102 or vary the transparency of the window 106. Although FIG. 2 shows system 200 as including a number and configuration of individual components, in some examples, any number of the components of system 200 may be combined and/or integrated as one device, e.g., the first vehicle, the light source, or the second vehicle. System 200 includes computing device n-202 (denoting any appropriate number of computing devices), server n-204 (denoting any appropriate number of servers), and one or more content databases n-206 (denoting any appropriate number of content databases), each of which is communicatively coupled to communication network 208, which may be the Internet or any other suitable network or group of networks. In some examples, system 200 excludes server n-204, and functionality that would otherwise be implemented by server n-204 is instead implemented by other components of system 200, such as computing device n-202. For example, computing device n-202 may implement some or all of the functionality of server n-204, allowing computing device n-202 to communicate directly with content database n-206. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202 includes control circuitry 218, I/O path 220, speaker 222, display 224, and user input interface 226. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server for processing and generating the corresponding displays.

A computing device n-202 may send instructions, e.g., to control the rate of alternating of the intensity of light output from the light source, and/or the rate at which the transparency of the window varies, to control circuitry 210.

User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from content database n-206), via communication network 208, content item identifiers, content metadata, natural language queries, and/or other data. Control circuitry 210 and/or 218 may be used to send and receive commands, requests, and other suitable data using I/O paths 212 and/or 220.

The system of FIG. 2 may be utilized to provide instructions to a computing device provided in a vehicle and/or a light source on the signals that should be received from the base station in order to derive the clock signal, and/or in the way in which the clock signal is to be derived from the received signals, and/or a target beat frequency of the clock signal (e.g., based on a location of the vehicle and/or light source), and/or an indicator of which phase of clock signal should be used for travel in a particular direction. For example, where a vehicle is travelling, different frequencies may be utilized to derive the clock signal in different regions, where vehicles located within the same region utilize the same frequency. The system of FIG. 2 may thus update the currently required frequencies based on the current location of the vehicle.

Figure 3A:
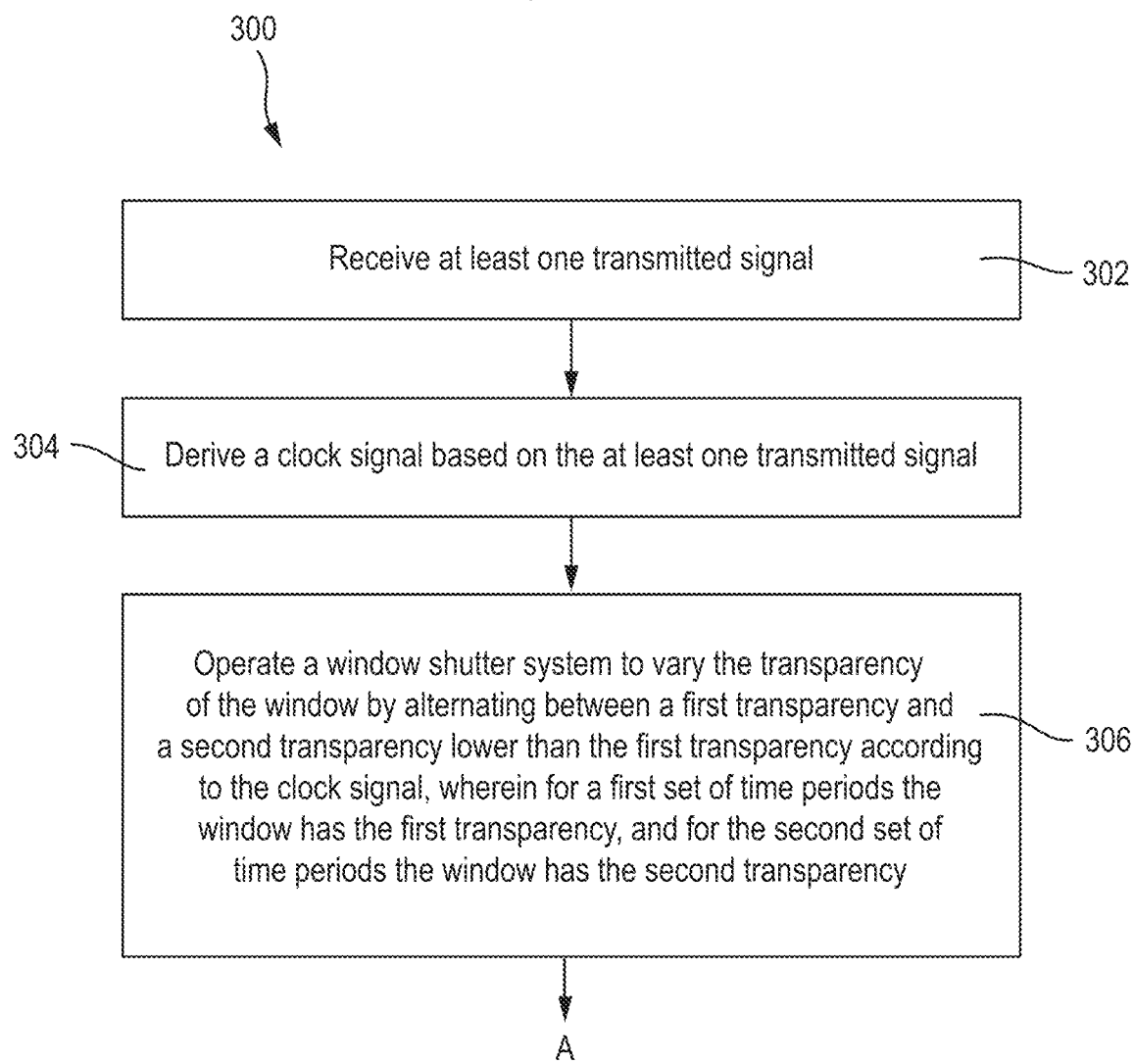

FIGS. 3A and 3B show a flowchart representing an illustrative process 300 for coordinating the variation of transparency of a window of a vehicle with the variation of the intensity of light output by a light source, such as the window 106 of the vehicle 104 and the light source 102 shown in FIG. 1. For the avoidance of doubt, the term "control circuitry" used in the below description applies broadly to the control circuitry outlined above with reference to FIG. 2. For example, control circuitry may comprise control circuitry of the first vehicle 104, the second vehicle 108, the light source 102, or the server 204, working either alone or in some combination.

At 302, at a vehicle comprising a window shutter system operable to vary the transparency of a window of the vehicle, control circuitry, e.g., control circuitry of the vehicle 104 or the window shutter system, receives at least one transmitted signal. In some examples, multiple signals may be received. The at least one transmitted signal may be received from a source external to the vehicle, such as a base station 110. For example, the at least one transmitted signal may be transmitted by a base station such as a radio station (e.g., a terrestrial radio station) and/or a satellite. The at least one transmitted signal may correspond to a current location of the vehicle 104. For example, the signal which is received at the vehicle 104 may be regional, where particular signals are transmitted for particular regions. Thus, when the vehicle 104 is located within a particular region, a particular signal may be received. A vehicle may be configured to select a radio channel or frequency based on a region in which the vehicle is currently located, or a particular location (e.g., GPS coordinates). Alternatively, a control system of the vehicle may receive a signal (e.g., from a server, such as the server n-204 of FIG. 2) indicating an appropriate channel that has been selected based on a determined region within which the vehicle is located. In an example, the vehicle (e.g., a control system of the vehicle) may periodically download a record indicating region boundaries and channels associated with each region. As each vehicle downloads this same record, each vehicle tunes to the same channel when located within the same region. This may enable a precise determination regarding which channel should be used in which region, helping to avoid vehicles proximate to each other being tuned to different radio channels. By periodically downloading such a record, each vehicle can maintain accurate channel determination capabilities even when offline. In other examples, the vehicle may periodically upload its position to a server, and the server may transmit an indication of the radio channel which should be used to the vehicle.

At 304, at the vehicle comprising the window shutter system operable to vary the transparency of the window of the vehicle, control circuitry, e.g., control circuitry of the vehicle 104 or the window shutter system, derives a clock signal 112 based on the at least one transmitted signal. For example, after a control system of the vehicle 104 tunes to the appropriate radio channels, it derives a common clock signal.

As was briefly mentioned above, a vehicle (and/or light source) may comprise a software defined radio (SDR). The term "SDR" may refer to any RF device for which some or all of its signal processing, and managing system, is based on software. An SDR generally comprises a radio front end and a digital back end. In an example SDR receiver (e.g., implemented at a vehicle), the radio front end is an RF tuner that converts the incoming radio-frequency (RF) signal into an intermediate-frequency (IF) signal. Subsequently, the IF signal is then fed into an analog-to-digital converter (ADC) that converts it into a digital signal. The digitized signal is then channelled into a digital back end for processing. SDRs are equipped to compensate the initial phases of transmitter and receiver local oscillator signals, and can therefore acquire phase-coherent in-phase data. SDRs at different vehicles and/or light sources may therefore receive transmitted signals with consistent phases. Thus, the derived clock signal may have a consistent phase when derived at different vehicles and/or light sources. In some examples, synchronization of the phase of received signals may be achieved using vehicle-to-everything (V2X) technology using any appropriate existing method.

The clock signal 112 may be derived by combining at least two received signals to generate a resulting signal, and iteratively combining one of the two received signals with the resulting signal until a derived signal having a beat frequency at or below a predetermined frequency is generated, wherein the derived signal is designated as the clock signal. In some examples, a control system at the vehicle, for example, a receiver, is programmed or configured to derive a common clock signal having a predetermined frequency by receiving and combining terrestrial radio signals (e.g., each radio signal may be carrying sound information for radio broadcasts on those channels). For example, a control system may receive two signals with similar frequencies (e.g., 550 and 560 kHz). The control system may then combine the received signals to generate a new signal. For instance, a superposition of AM radio signals of 550 kHz and 560 kHz generates a new signal having (i) a frequency that is the average of the two combined signals (555 kHz), and (ii) a beat frequency that is the difference in frequency between the two combined signals (10 kHz). The control system may then combine the first signal and the generated signal. The superposition of the generated signal (555 kHz) and the first signal (550 kHz) may create a signal having a frequency of 525.5 kHz and a beat frequency of 5 kHz. This process may then be repeated until a desired clock signal has been generated. For example, predefined conditions, such as a particular frequency, and/or beat frequency, may be known as target conditions for the clock signal (e.g., where the target condition is to produce a signal having a beat frequency at or below a predetermined frequency). Signals such as the first signal and each subsequently generated signal may therefore be iteratively combined until these target conditions are achieved. For example, algorithmically, iterations of superposition of the aforementioned signals may lead to a beat frequency at, below, or close to (e.g., within a predefined range of) a particular value such as 240 Hz (e.g., 156.25 Hz in this example), which may be a value which has been determined to be appropriate to operate the shuttering of the window and the flickering of a light source (such a frequency will enable the occupant of the vehicle to perceive the light and illuminated environment at a rate of 120 Hz). The predefined conditions, such as the frequency of signals to utilize to derive the clock signal, the target conditions, and the phase of clock signal to use for particular directions, may be stored at the vehicle and/or light source or may be received at the vehicle and/or light source from an external source. Different predefined conditions may be provided depending on a current location of the vehicle and/or light source. For example, when the vehicle and/or light source enters a new region, new predefined conditions, target conditions and directional phase conditions may be provided to the vehicle and/or the light source.

Figure 4:
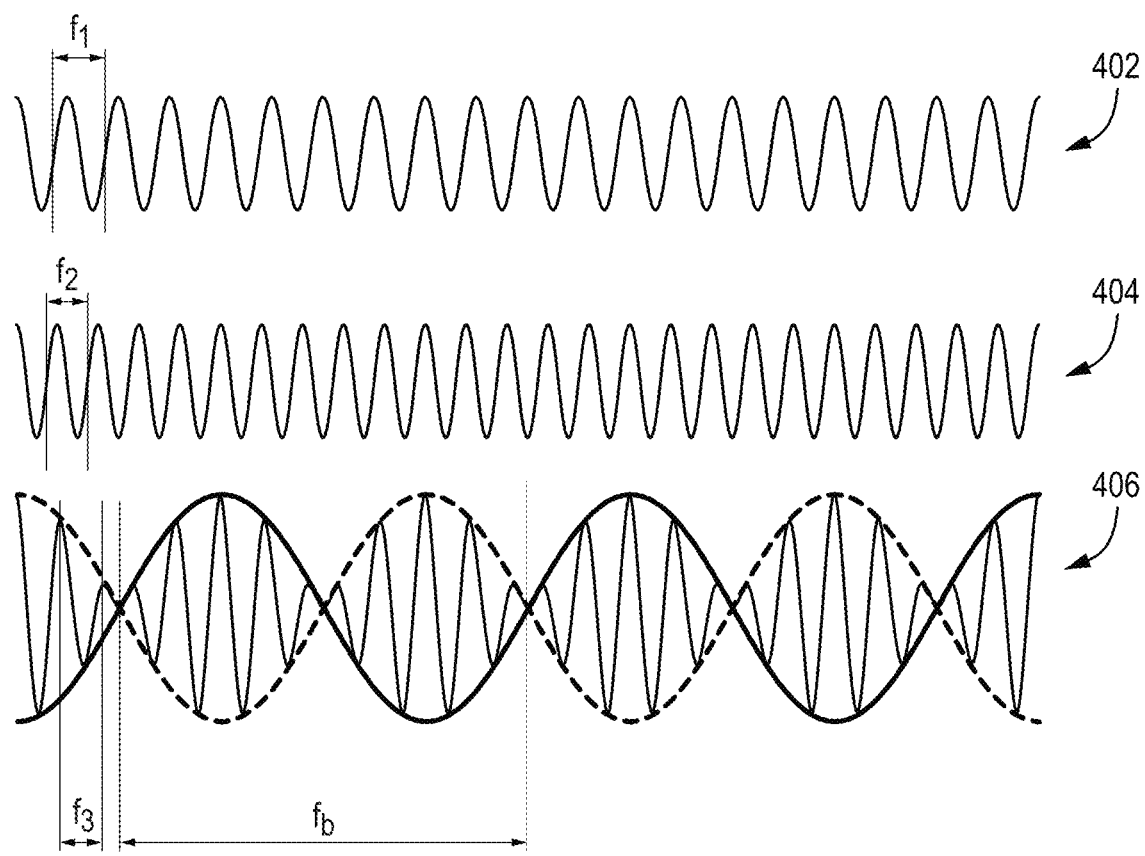
FIG. 4 illustrates the superposition of signals for the generation of a clock signal, in accordance with some examples of the disclosure.

FIG. 4 illustrates an example of the superposition of signals to generate a clock signal. In particular, FIG. 4 illustrates a first (transmitted) signal 402 having a frequency $f_1$ and a second (transmitted) signal 404 having a frequency $f_2$. These signals are then combined to generate a third signal 406 having a frequency $f_3$ and a beat frequency fb. In this example, the combination of the two signals (the first signal and the second signal) generates the third signal 406, the clock signal, having a beat frequency $f_b$. It will be appreciated that this shows just one combination of signals, whereas as is described above, the two originally received signals, and any generated signal produced from the combination of these two signals, may be used to derive a clock signal. Furthermore, in other examples, any number of signals may be combined in a predefined manner in order to derive the clock signal. The way in which the signals are to be combined to derive the clock signal may be predefined, such as the signals to be combined, the order in which signals are to be combined, and the way in which generated signals are to be iteratively combined with the originally received signals.

At 306, at the vehicle comprising the window shutter system operable to vary the transparency of the window of the vehicle, control circuitry, e.g., control circuitry of the vehicle 104 or the window shutter system, operates the window shutter system to vary the transparency of the window 106 by alternating between a first transparency and a second transparency lower than the first transparency according to the clock signal, wherein for a first set of time periods the window 106 has the first transparency, and for the second set of time periods the window 106 has the second transparency. The alternating of the transparency of the window and the alternating of the intensity of the light output by the light source may be at a rate corresponding to a beat frequency of the clock signal.

At 308, at a light source operable to vary the intensity of light output by the light source, control circuitry, e.g., control circuitry of the light source 102 or the vehicle 108, receives at least one transmitted signal. The at least one transmitted signal may correspond to a current location of the light source. As is described above, the at least one transmitted signal may be regional, where the signal which is transmitted is determined based on a particular region (e.g., is designated for that region). Thus, when the light source is in a particular region, a particular signal may be received. Where the light source 102 and the vehicle 104 are in the same region, the same at least one signal may be received. As is also described above, the at least one transmitted signal may be received from a source external to the light source, such as a base station.

At 310, at the light source operable to vary the intensity of light output by the light source, control circuitry, e.g., control circuitry of the light source 102 or the vehicle 108, derives the clock signal 112 based on the at least one transmitted signal. The derived clock signal 112 is the same clock signal as derived by the vehicle 104. The light source (and/or a vehicle comprising the light source) may be configured to receive the transmitted signal(s) and process the signals as is described above in respect of the vehicle 104. Thus, the light source may derive the clock signal as is described above in relation to the window shutter system.

At 312, at the light source operable to vary the intensity of light output by the light source, control circuitry, e.g., control circuitry of the light source 102 or the vehicle 108, operates the light source to vary the intensity of light output by the light source by alternating between a first intensity and a second intensity higher than the first intensity according to the clock signal 112, wherein for the first set of time periods the light source 102 outputs light of the first intensity and for the second set of time periods the light source 102 outputs light of the second intensity. The alternating of the transparency of the window and the alternating of the intensity of the light output by the light source 102 is at a rate corresponding to a beat frequency of the clock signal 112.

In some examples, the vehicle is travelling in a first direction comprised in a first set of predefined directions, and the light source is outputting light in, or is travelling in, a second direction comprised in a second set of predefined directions. For example, the light source 102 and the vehicle 104 may be travelling in substantially opposing directions, e.g., on the same road. In some examples, light output from the light source 102 is incident on the window 106 of the vehicle 104.

In some examples, the window shutter system is operated to vary the transparency of the window 106 according to a phase of the clock signal 112, wherein the window shutter system operates according to a first phase of the clock signal 112 when the vehicle 104 is travelling in a first direction comprised in a first set of predefined directions, and a second phase of the clock signal 112 when the vehicle 104 is travelling in a second direction comprised in a second set of predefined directions. For example, the derived clock signal having no phase shift may be utilized for travel in a first set of directions, and the derived clock signal having a phase shift of, for example, $$\frac{\pi}{2}$$

radians may be utilized for travel in a second set of directions. In some examples, the light source is operated to vary the intensity of light output by the light source according to a phase of the clock signal, wherein the light source operates according to the first phase of the clock signal when the light source is outputting light in, or is travelling in, a third direction comprised in a second set of predefined directions, and a second phase of the clock signal when the light source is outputting light in, or is travelling in, a fourth direction comprised in the first set of predefined directions. In some examples, the third direction is substantially the same direction as the second direction, and the fourth direction is the substantially the same direction as first direction, for example, where the vehicle and the light source are travelling in substantially opposing directions. It will be appreciated that if a vehicle changes direction, a change of phase may be made based on a determination of whether the vehicle is now travelling in a direction comprised in a first set of predefined directions, or a direction comprised in a second set of predefined directions.

A vehicle (and/or light source) may access data indicating that when the vehicle is travelling in a first direction, it should select a first phase (e.g., phase of 0 degrees, Amin to Amax, etc.) of the clock signal for operation and, when it is travelling in a second direction, it should select a second phase (e.g., phase of 180 degrees, Amax to Amin, etc.) of the clock signal for operation. The phase of the clock signal may indicate in which time periods the window should have a greater transparency, and in which time periods the light source should be outputting light of a higher intensity. For example, a first phase of the clock signal may indicate that, during the first set of time periods the window has a high transparency, and for the second set of time periods the window has a low transparency, whereas a second phase of the clock signal may indicate that, during the first set of time periods the window has a low transparency, and for the second set of time periods the window has a high transparency. Similarly, the first phase of the clock signal may indicate that, during the first set of time periods the light source outputs light of a low intensity, and for the second set of time periods the light source outputs light of a high intensity, whereas a second phase of the clock signal may indicate that, during the first set of time periods the light source outputs light of a high intensity, and for the second set of time periods the light source outputs light of a low intensity. It will be appreciated that the examples herein utilise this interpretation of the phases of the clock signal to define periods of high and low intensity light, and greater and lesser window transparency, however, it will be appreciated that the respective variations in the intensity of light and window transparency may be set for particular phases in any appropriate manner.

In some examples, the direction of travel of the vehicle (or a light source) is determined based on any, or any combination of, a direction the vehicle (or light source) is facing, a direction of travel of the vehicle (or light source) during a predefined time period, an intended path of travel of the vehicle (or light source), or a road on which the vehicle (or light source) is currently travelling. For example, the direction that a vehicle (or light source) is facing may be determined by onboard sensors. The direction of travel of the vehicle (or light source) may be determined based on GPS coordinates over a particular time period (e.g., 5 seconds). An intended path of travel of a vehicle (or light source) may be determined based on a route mapped by a trip computer comprised in or associated with the vehicle (or light source). GPS coordinates may also be used to determine a road on which the vehicle (or light source) is currently travelling.

As is described above, the direction in which the vehicle is travelling may be used to determine which phase of the clock signal is to be used to determine when the window should be more and less transparent. In some examples, any vehicle travelling in the first set of predefined directions may operate the window shutter system according to a first phase of the clock signal, and where that vehicle also comprises a light source, the light source may be operated according to a second phase of the clock signal. Any vehicle travelling in the second set of predefined directions may operate a light source of the vehicle according to a first phase of the clock signal, and may operate the window shutter system of the vehicle according to a second phase of the clock signal. This configuration is illustrated in FIG. 5.

Figure 5:
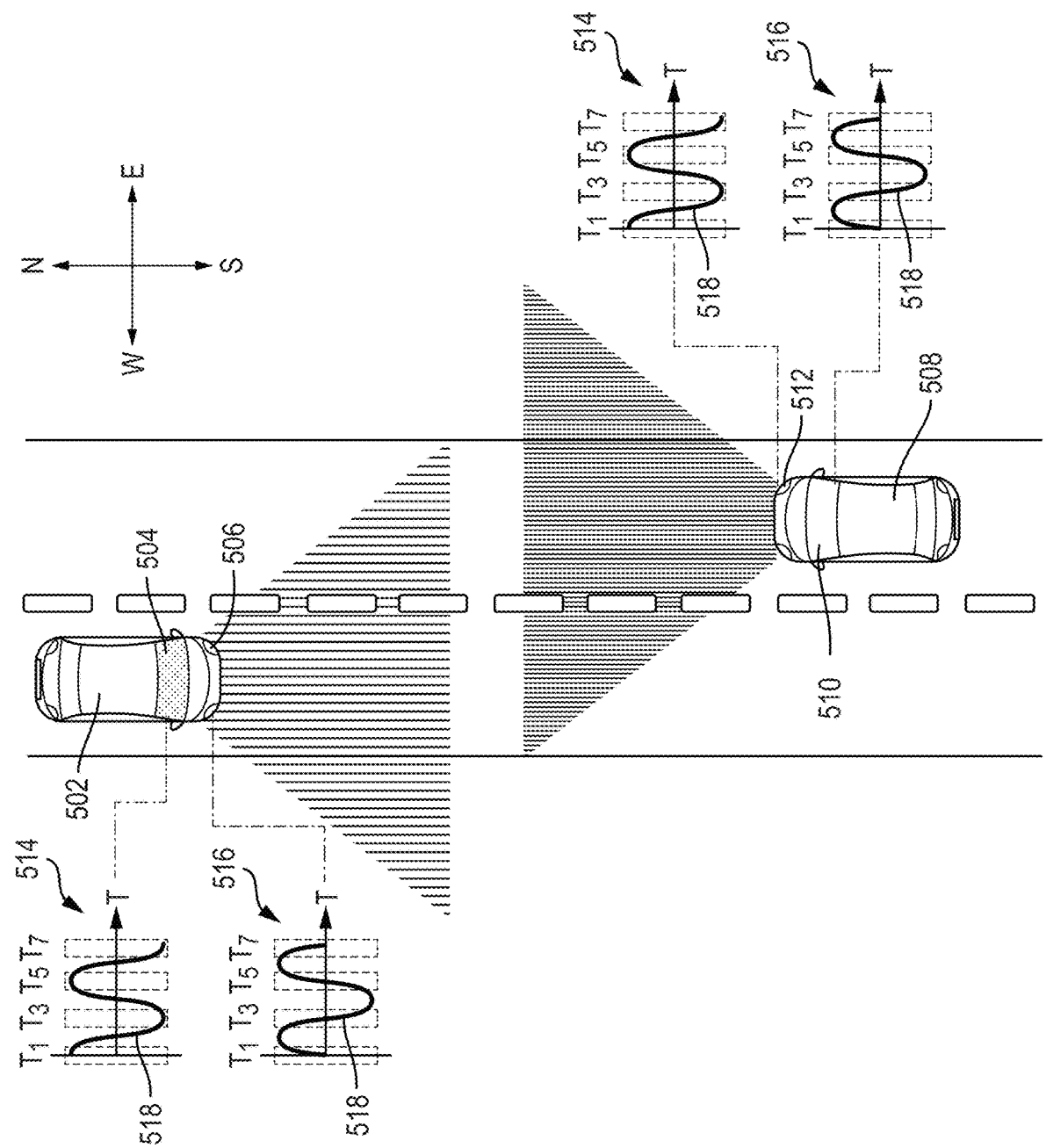
FIG. 5 illustrates a system for coordinating variations in the transparency of a window of a first vehicle with variations in the intensity of light output by a second vehicle, and coordinating variations in the transparency of a window of the second vehicle with variations in the intensity of light output by the first vehicle, in accordance with some examples of the disclosure.

In particular, FIG. 5 illustrates a first vehicle 502 comprising a first window 504 operable to switch between a more and less transparent state, and further comprising a first light source 506. FIG. 5 further illustrates a second vehicle 508 comprising a second window 510 operable to switch between a more and less transparent state, and a second light source 512. As can be seen in this Figure, the first vehicle 502 is travelling in a first direction which in this example is substantially South, and the second vehicle 508 is travelling in a second direction which in this example is substantially North. The first window 504 is operated according to a second phase 514 of the clock signal 518, while the first light source 506 is operated according to a first phase 516 of the clock signal 518. The second window 510 is operated according to a first phase 516 of the clock signal 518, while the second light source 512 is operated according to the second phase 514 of the clock signal 518. This coordination of phases enables each vehicle to increase the transparency of their window while increasing the intensity of light output from their light source, and reduce the transparency of their window while reducing the intensity of light output from their light source, where this coordination will cause an occupant of the vehicle to experience the headlights as outputting a high intensity light. At the same time, the coordination between vehicles results in an increase in intensity of light output from a light source of one vehicle while another (oncoming) vehicle reduces the transparency of their window, thereby reducing the intensity of headlights experienced by the oncoming vehicle.

This coordination is illustrated in FIG. 6, which in particular shows graphs illustrating the variation in intensity of the headlights of the first vehicle 502 and the second vehicle 508, and the variation in transparency of a window of the first vehicle 502 and the second vehicle 508, over a particular time period. As can be seen here, graph 1 602 and graph 2 604 illustrate that during a first time period 610, the intensity of the light output from the light source of the first vehicle is low, and the intensity of the intensity of the light output from the light source of the second vehicle is high. During the same time period, as is shown in graph 3 606 and graph 4 608, the transparency of the window of the first vehicle is low, and the transparency of the window of the second vehicle is high. During a second time period 612, the intensity of the light output from the light source of the first vehicle is high, and the intensity of the intensity of the light output from the light source of the second vehicle is low. During the same time period, the transparency of the window of the first vehicle is high, and the transparency of the window of the second vehicle is low.

Figure 7B:
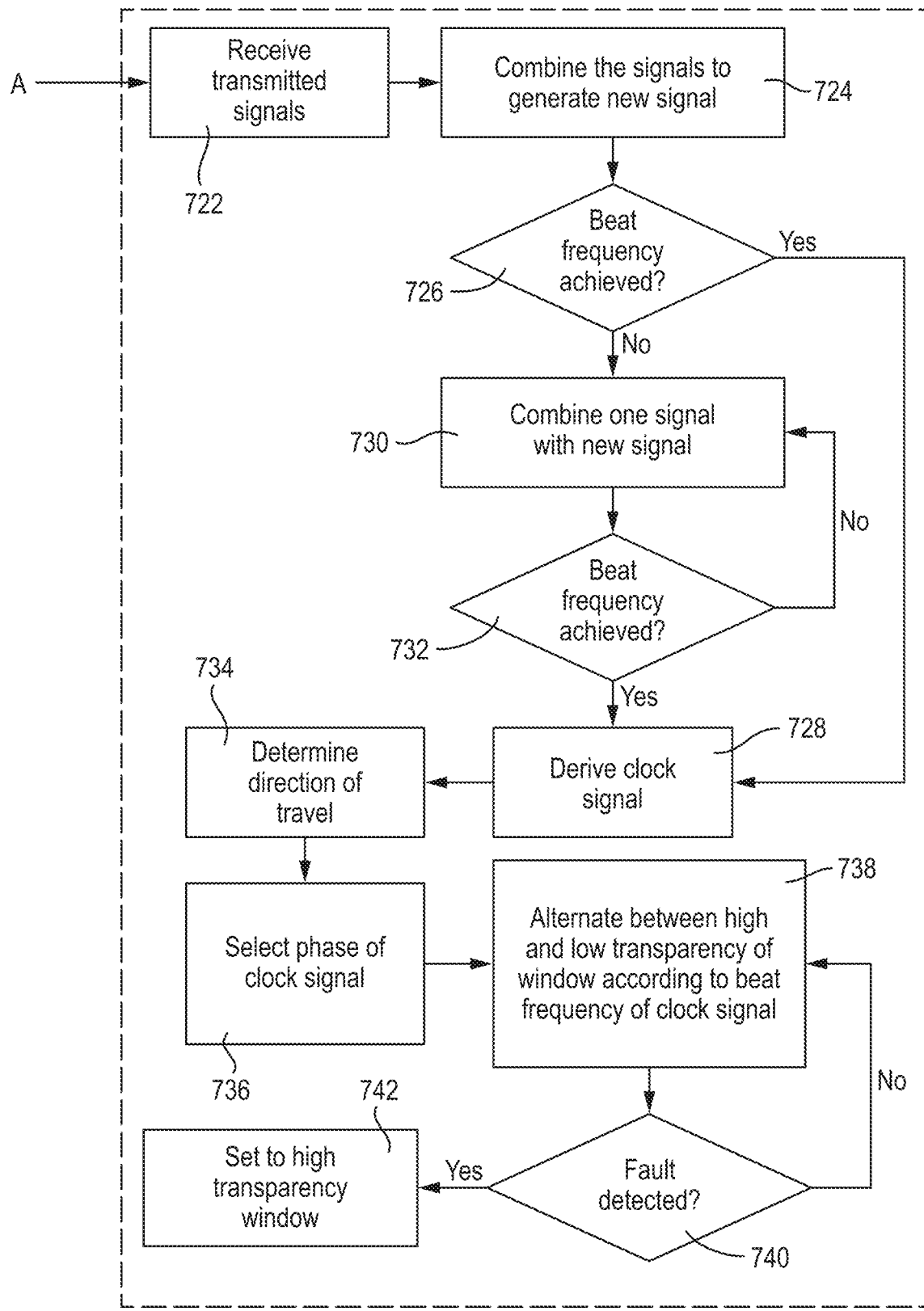

FIGS. 7A and 7B illustrate a flowchart representing a process for coordinating variations in the transparency of a window of a vehicle with variations in the intensity of light output by a light source, in accordance with some examples of the disclosure.

At 702, control circuitry, for example, control circuitry of a base station (such as a radio station) transmits at least one signal. The signal may be regional. For example, the transmitted signal may correspond to a particular location, where a vehicle or light source may also be located or associated with that particular location.

At 704, control circuitry, for example, control circuitry of the light source 102, receives the at least one transmitted signal. The light source may be operable to vary the intensity of light output by the light source.

At 706, control circuitry, for example, control circuitry of the light source 102, combines the signals to generate a new signal.

At 708, control circuitry, for example, control circuitry of the light source 102, determines whether a predetermined beat frequency has been achieved (for example, it is determined whether the new signal has the desired beat frequency).

Where it is determined at 708 that the beat frequency has been achieved (YES at 708), at 710, control circuitry, for example, control circuitry of the light source 102, derives a clock signal. For example, the new signal is designated as the clock signal.

Where it is determined at 708 that the beat frequency has not been achieved (NO at 708), at 712, control circuitry, for example, control circuitry of the light source 102, combines one of the received signals with the newly generated signal, for example, to generate a further signal.

At 714 it is determined whether a predetermined beat frequency has been achieved (for example, it is determined whether the further signal has the desired beat frequency). Where it is determined at 714 that the beat frequency has not been achieved, the process moves back to 712, and the process is repeated until a new signal having the desired beat frequency is generated.

Where it is determined at 714 that the beat frequency has been achieved (YES at 714) (e.g., it is determined that the new signal has the desired beat frequency), the process moves to 710.

At 716, control circuitry, for example, control circuitry of the light source 102, determines the direction of travel (or direction of output of light) of the light source. For example, it is determined whether the light source 102 is travelling in a direction comprised in a first set of directions, or in a direction comprised in a second set of directions.

At 718, control circuitry, for example, control circuitry of the light source 102, selects a phase of the clock signal based on the direction of travel (or direction of output of light). For example, a first phase is selected when the light source is traveling in a direction comprised in a first set of directions, and a second phase is selected when the light source is travelling in a direction comprised in a second set of directions. The difference between the first phase and the second phase may be radians.

At 720, control circuitry, for example, control circuitry of the light source 102, causes the light source to output light which alternates between high and low intensity light according to the beat frequency of the clock signal. For example, the light source is operated to vary the intensity of light output by the light source by alternating between a first intensity and a second intensity higher than the first intensity according to the clock signal, wherein for the first set of time periods the light source outputs light of the first intensity and for the second set of time periods the light source outputs light of the second intensity (e.g., as the light source is travelling in a direction comprised in the first set of directions).

At 722, control circuitry, for example, control circuitry of the vehicle 104, receives the at least one transmitted signal. The vehicle may comprise a window shutter system operable to vary the transparency of a window of the vehicle.

At 724, control circuitry, for example, control circuitry of the vehicle 104, combines the signals to generate a new signal.

At 726, control circuitry, for example, control circuitry of the vehicle 104, determines whether a predetermined beat frequency has been achieved (for example, it is determined whether the new signal has the desired beat frequency, or has a beat frequency below the desired beat frequency).

Where it is determined at 726 that the beat frequency has been achieved (YES at 726), at 728, control circuitry, for example, control circuitry of the vehicle 104, derives a clock signal. For example, the new signal is designated as the clock signal.

Where it is determined at 726 that the beat frequency has not been achieved (NO at 726), at 730, control circuitry, for example, control circuitry of the vehicle 104, combines one of the received signals with the newly generated signal, for example, to generate a further signal.

At 732 it is determined whether a predetermined beat frequency has been achieved (for example, it is determined whether the further signal has the desired beat frequency). Where it is determined at 732 that the beat frequency has not been achieved (NO at 732), the process moves back to 730, and the process is repeated until a new signal having the desired beat frequency is generated.

Where it is determined at 732 that the beat frequency has been achieved (YES at 732) (e.g., it is determined that the new signal has the desired beat frequency), the process moves to 728.

At 734, control circuitry, for example, control circuitry of the vehicle 104, determined the direction of travel of the vehicle. For example, it is determined whether the vehicle 104 is travelling in a direction comprised in a first set of directions or a direction comprised in a second set of directions. The direction of travel of the vehicle may be determined based on at least one of a direction the vehicle is facing, a direction of travel of the vehicle during a predefined time period, an intended path of travel of the vehicle, or a road on which the vehicle is currently travelling.

At 736, control circuitry, for example, control circuitry of the vehicle 104, selects a phase of the clock signal based on the determined direction of travel. For example, a first phase is selected when the vehicle is traveling in a direction comprised in a first set of directions, and a second phase is selected when the vehicle is travelling in a direction comprised in a second set of directions. The difference between the first phase and the second phase may be $$\frac{\pi}{2}$$

radians.

At 738, control circuitry, for example, control circuitry of the vehicle 104, causes the window of the vehicle to alternate between high transparency and low transparency according to the beat frequency of the clock signal. For example, the window shutter system is operated to vary the transparency of the window by alternating between a first transparency and a second transparency lower than the first transparency according to the clock signal, wherein for a first set of time periods the window has the first transparency, and for the second set of time periods the window has the second transparency (e.g., as the vehicle is travelling in a direction comprised in the second set of directions).

At 740, control circuitry, for example, control circuitry of the vehicle 104, determines whether a fault has been detected with the window shutter system controlling the transparency of the window. Where no fault is detected (NO at 740), the process moves back to 738.

Where a fault is detected, (YES at 740), at 742, control circuitry, for example, control circuitry of the vehicle 104, sets the window transparency to high.

The actions or descriptions of FIG. 7 may be done in any suitable alternative orders or in parallel to further the purposes of this disclosure.

The methods described herein do not rely on vehicle-to-vehicle communications or common clocks generated by external sources. Rather, the methods leverage already-available signals, such as terrestrial radio signals, to derive a common clock for vehicles. That is, unlike prior systems, the disclosed techniques enable a plurality of vehicles (e.g., three or more) to coordinate the operation of window shuttering and light source flickering via a common clock that is derived from one or more external signals transmitted from an external source (e.g., a radio tower) and that is therefore independent of any of the vehicles. The external clock may be derived from multiple signals received from a radio tower, for example. These methods are scalable to enable coordination regardless of how many vehicles or clusters of vehicles are present on the road.

By contrast, for a system that relies on vehicle-to-vehicle (V2V) communications to establish a common clock, coordination may become complex when more vehicles must be considered. For example, such a system will struggle to constantly assign and reassign a particular vehicle, within range of other vehicles, as the anchor providing the common signal that nearby vehicles should reference. Particularly during heavy traffic, conflicts may emerge, making it difficult for the vehicles to determine which car should serve as the anchor at any given time. Thus, establishing a common clock via a V2V communication, and coordinating a large number of vehicles according to a common clock, may be impractical in a heavy traffic environment.

Figure 8A:
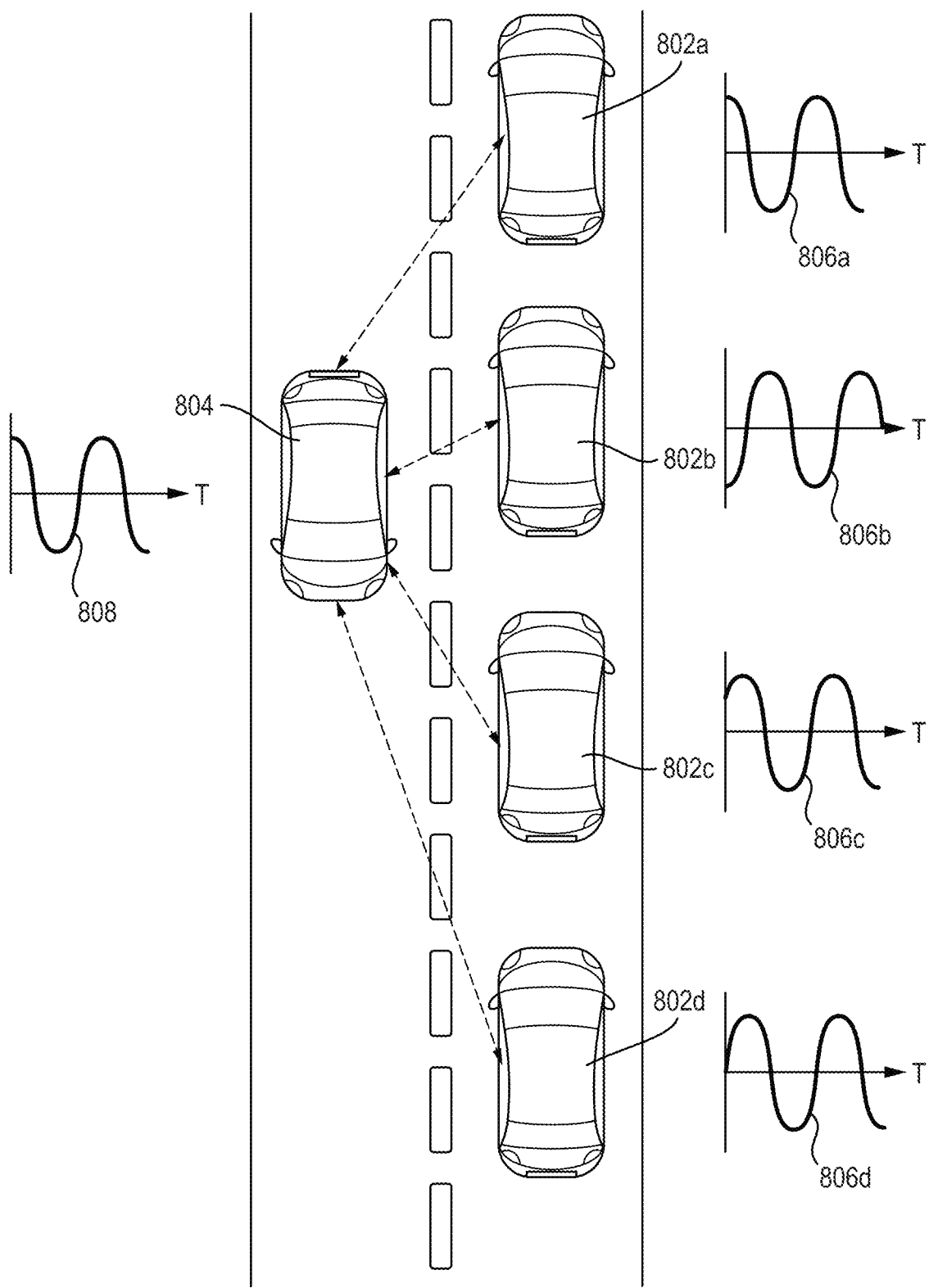
FIG. 8A illustrates an example of the coordination of clock signals for multiple vehicles using vehicle-to-vehicle communication.

FIG. 8A illustrates a system relying on vehicle-to-vehicle communication. In particular, FIG. 8 illustrates a plurality of first vehicles 802*a-d* travelling in a first direction, and a second vehicle 804 travelling in a second direction. As is illustrated here, the second vehicle is in communication with the plurality of first vehicles (e.g., due to the proximity of each of the plurality of first vehicles and the second vehicle). Where the system relies on vehicle-to-vehicle communication, it may be assumed that a vehicle will be operating their light source and window system according to a particular clock signal. Therefore, a vehicle travelling in an opposing direction will need to either adopt the clock signal of the other vehicle, or the other vehicle will need to adopt a new clock signal corresponding to an operation of the light source and window system of the vehicle. While this is feasible where there are only two vehicles travelling in opposing directions, where multiple vehicles are travelling in one direction, it may be difficult for a vehicle travelling in an opposing direction to determine which vehicle they should use to establish a clock signal, particularly where the vehicles are close together. As is illustrated in this Figure, each of the plurality of first vehicles 802*a-d* may comprise a different clock signal 806*a-d*. The second vehicle 804 also has its own clock signal 808. In order to synchronize clock signals, either the second vehicle must sequentially adopt each of the clock signals 806*a-d* of the plurality of first vehicles 802*a-d* such that an appropriate clock signal is used as the second vehicle 804 passes an individual first vehicle, or each of the plurality of first vehicles 802*a-d* must adopt the clock signal 808 of the second vehicle 804. In either case, this may be impractical. For example, either the clock signal of multiple vehicles must be altered in order to accommodate one vehicle travelling in the opposing direction, which requires a high processing load, or a vehicle must rapidly alter the clock signal that they are using to control their light source and window system, which is unlikely to result in a satisfactory synchronization with the other vehicles. Furthermore, it may be unclear which of the plurality of vehicles should act as an anchor for the other vehicles, which may cause further delays in the modification of the operation of the light sources and window shutter systems.

Figure 8B:
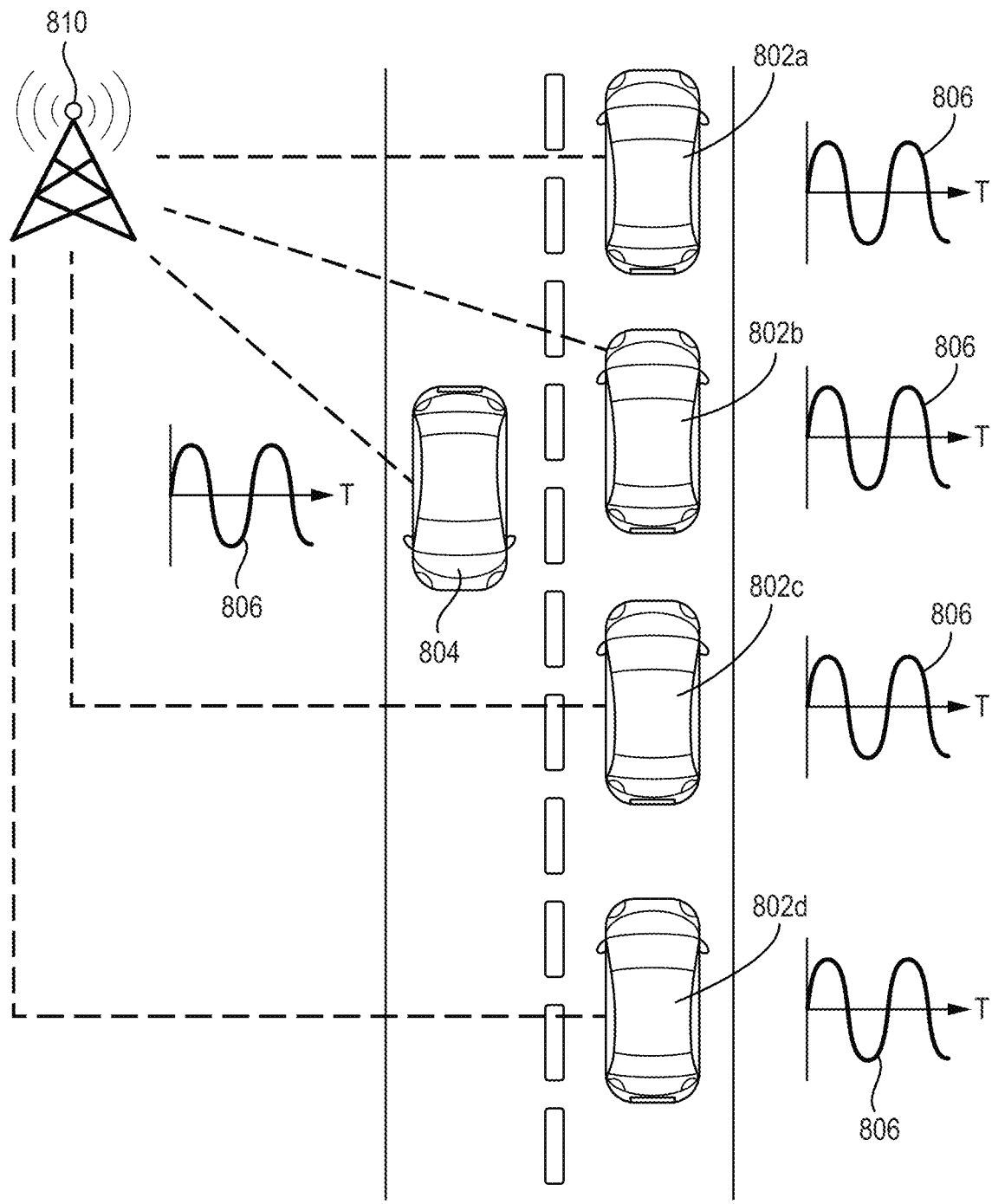
FIG. 8B illustrates an example of the coordination of clock signals for multiple vehicles, in accordance with some examples of the disclosure.

FIG. 8B illustrates an example of the methods and systems described herein, in which a plurality of first vehicles 802*a-d* are travelling in a first direction, and a second vehicle 804 is travelling in a second direction. Rather than relying on vehicle-to-vehicle communication as is described in relation to FIG. 8A, FIG. 8B further illustrates a base station 810, such as a radio tower, which is in communication with each of the vehicles. In particular, the vehicles are able to receive signals transmitted from the base station 810. As is described above, each of the vehicles receive the same signals from the base station, and are therefore able to derive a clock signal 806 which is common to all the vehicles. In this way, all of the vehicles will operate in sync with one another to shutter their windows and operate their light sources as is described herein.

In the examples above, generally, the methods are described in terms of a headlight system of a vehicle, and a windscreen of a vehicle, where vehicles travelling in opposing directions are considered. However, it will be appreciated that the methods may apply equally to other scenarios. For example, the methods may be applicable to a rear windscreen of a vehicle, a mirror, such as a rearview mirror, of a vehicle, and so on. It will be further appreciated that the technology which enables the increase in opacity of a window may be equally applied to reduce the reflectiveness of a mirror. The light source may also be a light source of a vehicle which is not a front headlight of a vehicle, and may instead be rear headlights, a particular configuration of headlight, such as full-beam headlights, or may instead be a light source which is not associated with a vehicle, such as a static light source (for example, signage, such as pedestrian signage).

FIG. 9 illustrates an example of a configuration in which the methods described above are instead applied to a rearview mirror of a vehicle. In particular, FIG. 9 shows a first vehicle 902 having a rearview (side) mirror shutter system which is operable to vary the amount of light reflected by a mirror 904. A second vehicle 906 comprises a light source 908 (in this case, a headlight system) which is operable to vary the intensity of light output by the light source. While not illustrated here, the first vehicle 902 and the second vehicle 906 have received transmitted signals, for example, from a base station, and have derived a common clock signal 910. During a first set of time periods ($T_1$, $T_3$, $T_5$, $T_7$), the mirror shutter system is operated such that the reflectiveness of the mirror 904 is high (e.g., where no voltage is applied to a system which controls the reflectiveness of the mirror), and the light source 908 is operated such that the intensity of light output from the light source 908 is low. During a second set of time periods ($T_2$, $T_4$, $T_6$), the mirror shutter system is operated such that the reflectiveness of the mirror 904 is low (e.g., where a voltage is applied to the system which controls the reflectiveness of the mirror), and the light source 906 is operated such that the intensity of light output from the light source is high. It is noted that, in this example, the phase of operation of the clock signal is the same for the light source 908 of the second vehicle 906 and the mirror shutter system of the first vehicle 902, as both vehicles are travelling in the same direction.

FIG. 10 illustrates an example of a configuration in which the methods described above are instead applied to a rearview window of a vehicle. In particular, FIG. 10 shows a first vehicle 1002 having a rear window shutter system which is operable to vary the transparency of a rear window 1004 of the vehicle. A second vehicle 1006 comprises a light source 1008 (in this case, a headlight system) which is operable to vary the intensity of light output by the light source. While not illustrated here, the first vehicle 1002 and the second vehicle 1006 have received transmitted signals, for example, from a base station, and have derived a common clock signal 1010. During a first set of time periods ($T_1$, $T_3$, $T_5$, $T_7$), the rear window shutter system is operated such that the transparency of the window 1004 is high (e.g., where no voltage is applied to a window shutter system which controls the transparency of the window), and the light source 1008 is operated such that the intensity of light output from the light source 1008 is low. During a second set of time periods ($T_2$, $T_4$, $T_6$), the rear window shutter system is operated such that the transparency of the rear window 1004 is low (e.g., where a voltage is applied to the window shutter system which controls the transparency of the window), and the light source 1006 is operated such that the intensity of light output from the light source is high. It is noted that, in this example, the phase of operation of the clock signal is the same for the light source of the second vehicle and the rear window shutter system of the first vehicle, as both vehicles are travelling in the same direction.

In some examples, a vehicle may include an interface for providing an override command of the shutter and/or light pulsing systems. For example, an occupant or operator of the vehicle may selectively override the system such that the light has a constant output of intensity (e.g., either high or low), and the window remains transparent.

In some examples, the window shutter system may comprise a "fail open" configuration, ensuring that light always passes through when the active shutter system fails. For example, in response to detecting a fault in the window shutter system, the window may be set to the first (higher) transparency. Similarly, the light pulsing system may have a "fail open" system, ensuring that the headlights emit light when a failure occurs (e.g., rather than failing to a state of blocking or deactivating light). For example, in response to detecting a fault in the light source, or a controller associated with the light source, the light source may be set to output light.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    at a vehicle comprising a window shutter system operable to vary a transparency of a window of the vehicle:
        receiving, using control circuitry, at least one transmitted signal;
        deriving, using the control circuitry, a clock signal based at least in part on the at least one transmitted signal; and
        operating, using the control circuitry, the window shutter system to vary the transparency of the window by alternating between a first transparency and a second transparency lower than the first transparency according to the clock signal, wherein for a first set of time periods the window has the first transparency, and for a second set of time periods the window has the second transparency; and
    at a light source operable to vary an intensity of light output by the light source:
        receiving, using the control circuitry, the at least one transmitted signal;
        deriving, using the control circuitry, the clock signal based at least in part on the at least one transmitted signal; and
        operating, using the control circuitry, the light source to vary the intensity of light output by the light source by alternating between a first intensity and a second intensity higher than the first intensity according to the clock signal, wherein for the first set of time periods the light source outputs light of the first intensity and for the second set of time periods the light source outputs light of the second intensity.

2. The method of claim 1, wherein the vehicle is travelling in a first direction comprised in a first set of predefined directions, and the light source is outputting light in, or is travelling in, a second direction comprised in a second set of predefined directions.

3. The method of claim 1, wherein:
    the window shutter system is operated to vary the transparency of the window according to a phase of the clock signal, wherein the window shutter system operates according to a first phase of the clock signal when the vehicle is travelling in a first direction comprised in a first set of predefined directions, and a second phase of the clock signal when the vehicle is travelling in a second direction comprised in a second set of predefined directions; and
    the light source is operated to vary the intensity of light output by the light source according to a phase of the clock signal, wherein the light source operates according to the first phase of the clock signal when the light source is outputting light in, or is travelling in, a third direction comprised in the second set of predefined directions, and a second phase of the clock signal when the light source is outputting light in, or is travelling in, a fourth direction comprised in the first set of predefined directions.

4. The method of claim 3, wherein a difference of the phase between the first phase and the second phase is $$\frac{\pi}{2}$$

radians.

5. The method of claim 1, wherein the alternating of the transparency of the window and the alternating of the intensity of the light output by the light source is at a rate corresponding to a beat frequency of the clock signal.

6. The method of claim 2, wherein the first direction of travel of the vehicle is determined based at least in part on at least one of: a direction the vehicle is facing, a direction of travel of the vehicle during a predefined time period, an intended path of travel of the vehicle, or a road on which the vehicle is currently travelling.

7. The method of claim 1, wherein the clock signal is derived by combining at least two received signals to generate a resulting signal, and iteratively combining one of the two received signals with the resulting signal until a derived signal having a beat frequency at or below a predetermined frequency is generated, wherein the derived signal is designated as the clock signal.

8. The method of claim 1, wherein the at least one transmitted signal corresponds to a current location of at least one of the vehicle or the light source.

9. The method of claim 1, wherein the at least one transmitted signal is received from a source external to the vehicle and the light source.

10. The method of claim 1, wherein the method further comprises, based at least in part on detecting a fault in the window shutter system, setting the window to the first transparency.

11. A system comprising control circuitry configured to:
    at a vehicle comprising a window shutter system operable to vary a transparency of a window of the vehicle:
        receive at least one transmitted signal;
        derive a clock signal based at least in part on the at least one transmitted signal; and
        operate the window shutter system to vary the transparency of the window by alternating between a first transparency and a second transparency lower than the first transparency according to the clock signal, wherein for a first set of time periods the window has the first transparency, and for a second set of time periods the window has the second transparency; and at a light source operable to vary an intensity of light output by the light source:
receive the at least one transmitted signal;
derive the clock signal based at least in part on the at least one transmitted signal; and
operate the light source to vary the intensity of light output by the light source by alternating between a first intensity and a second intensity higher than the first intensity according to the clock signal, wherein for the first set of time periods the light source outputs light of the first intensity and for the second set of time periods the light source outputs light of the second intensity.

12. The system of claim 11, wherein the vehicle is travelling in a first direction comprised in a first set of predefined directions, and the light source is outputting light in, or is travelling in, a second direction comprised in a second set of predefined directions.

13. The system of claim 11, wherein
the window shutter system is operated to vary the transparency of the window according to a phase of the clock signal, wherein the window shutter system operates according to a first phase of the clock signal when the vehicle is travelling in a first direction comprised in a first set of predefined directions, and a second phase of the clock signal when the vehicle is travelling in a second direction comprised in a second set of predefined directions; and
the light source is operated to vary the intensity of light output by the light source according to a phase of the clock signal, wherein the light source operates according to the first phase of the clock signal when the light source is outputting light in, or is travelling in, a third direction comprised in the second set of predefined directions, and a second phase of the clock signal when the light source is outputting light in, or is travelling in, a fourth direction comprised in the first set of predefined directions.

14. The system of claim 13, wherein a difference of the phase between the first phase and the second phase is $$\frac{\pi}{2}$$

radians.

15. The system of claim 11, wherein the alternating of the transparency of the window and the alternating of the intensity of the light output by the light source is at a rate corresponding to a beat frequency of the clock signal.

16. The system of claim 12, wherein the first direction of travel of the vehicle is determined based at least in part on at least one of: a direction the vehicle is facing, a direction of travel of the vehicle during a predefined time period, an intended path of travel of the vehicle, or a road on which the vehicle is currently travelling.

17. The system of claim 11, wherein the clock signal is derived by combining at least two received signals to generate a resulting signal, and iteratively combining one of the two received signals with the resulting signal until a derived signal having a beat frequency at or below a predetermined frequency is generated, wherein the derived signal is designated as the clock signal.

18. The system of claim 11, wherein the at least one transmitted signal corresponds to a current location of at least one of the vehicle or the light source.

19. The system of claim 11, wherein the at least one transmitted signal is received from a source external to the vehicle and the light source.

20. The system of claim 11, wherein the system is further configured to, based at least in part on detecting a fault in the window shutter system, set the window to the first transparency.

\* \* \* \* \*